(12) United States Patent
Hayward

(10) Patent No.: US 7,661,103 B2
(45) Date of Patent: Feb. 9, 2010

(54) APPARATUS, SYSTEM, AND METHOD FOR DECENTRALIZED DATA CONVERSION

(76) Inventor: Jerry Glade Hayward, 783 E. 700 North, American Fork, UT (US) 84003

(*) Notice: Subject to any disclaimer, the term of this patent is extended or adjusted under 35 U.S.C. 154(b) by 326 days.

(21) Appl. No.: 11/566,035

(22) Filed: Dec. 1, 2006

(65) Prior Publication Data
US 2007/0160067 A1    Jul. 12, 2007

Related U.S. Application Data

(63) Continuation-in-part of application No. 11/115,898, filed on Apr. 27, 2005.

(51) Int. Cl.
*G06F 9/445* (2006.01)
*G06F 15/16* (2006.01)
*G06F 3/00* (2006.01)

(52) U.S. Cl. ............... 717/178; 709/246; 715/749
(58) Field of Classification Search ............ 707/100; 717/174, 175, 176, 177, 178; 709/246; 715/748, 715/749
See application file for complete search history.

(56) References Cited

U.S. PATENT DOCUMENTS

| 6,996,589 | B1* | 2/2006 | Jayaram et al. | 707/204 |
| 2003/0140007 | A1* | 7/2003 | Kramer et al. | 705/40 |
| 2004/0254881 | A1* | 12/2004 | Kumar et al. | 705/40 |

* cited by examiner

*Primary Examiner*—Tony Mahmoudi
*Assistant Examiner*—Md. I Uddin
(74) *Attorney, Agent, or Firm*—Kunzler & McKenzie

(57) ABSTRACT

An apparatus, system, and method are disclosed for decentralized data conversion. The present invention includes providing a server configured to be accessible over the Internet and receiving a payment from a user through a payment gateway module, the gateway module operated by the server. Additionally, the invention includes receiving a data source over the Internet into the server, transforming data in the data source to create converted data adapted to a target, the transformation directed by one or more integration objects configured to perform conversion steps, the integration objects in a hierarchical structure defining an order of execution, the transformation controlled by the server, and returning the transformed data over the Internet from the server. The present invention allows customers who would otherwise be unable to access powerful data conversion tools to convert data at a reasonable cost.

20 Claims, 17 Drawing Sheets

APPARATUS, SYSTEM, AND METHOD FOR DECENTRALIZED DATA CONVERSION

CROSS-REFERENCES TO RELATED APPLICATIONS

This application is a continuation-in-part of and claims priority to U.S. patent application Ser. No. 11/115,898 entitled "Data Conversion System, Method, and Apparatus" and filed on Apr. 27, 2005 for Jerry Glade Hayward, which is incorporated herein by reference.

BACKGROUND OF THE INVENTION

1. Field of the Invention

This invention relates to data conversion and more particularly relates to internet-based data conversion.

2. Description of the Related Art

Modern computer systems vary in their design and architecture, with many different models available to achieve the desired combinations of speed, power and efficiency for any given computer environment. This multitude of different computing environments allows a consumer to select the right computer for a particular job. For instance, an engineering firm might need a computer aided design station, which necessitates a very powerful, fast computer, using the newest and most powerful operating system. Meanwhile, a home user might simply want to connect to the Internet to send and receive email, which does not require the expense of a fast computer, nor the most current operating system. Further, computer professionals have the capability to create proprietary computer devices, structures and systems that may be unique and may be uniquely adapted to a particular user or user set. Thus, the proliferation of different computing environments has been beneficial.

Further, as technology rapidly advances, new devices, structures, and systems are developed and enterprises must make decisions as to when and what to adopt. Therefore, the variability of computer devices, structures, and systems is increased, as each enterprise must look to its own position and needs. Also, as an enterprise may acquire or merge with other enterprises, there may be collected a great variety of computing systems, including many diverse databases. Therefore there may be many reasons for an enterprise to find itself using a variety of systems of varying age and compatibility.

However, there are drawbacks to this multitude of computer systems. Because each computer system, including the operating system, may be designed differently, the way that data is actually stored on each computer system may be different. For instance, a set of data stored by a Cobol program looks very different from the same data stored by Oracle. Further, legacy systems (systems that continue to be used despite poor performance/compatibility with modern systems because of a prohibitive cost/time of redesigning/replacing) may be difficult to work with due to varying standards and/or inconvenient methods of storing data. Therefore, it becomes difficult to synchronize/port data between different computer systems.

Data is generally stored as a series of bytes, words, or double words, depending on the format of the medium holding the data and any format choices made by a storage program. Storage formats vary greatly as any format imaginable may be used. Where data must be transferred from a first format to a second format, it must first be transformed into a format appropriate to the second format. Therefore data is converted, usually by a data conversion program that is "hard-coded," meaning it has been written expressly to make such a specific conversion.

However, where the data format of the storage medium changes, the "hard-coded" data conversion program must also be changed or rewritten to deal with the new changes. For instance, if the data is the output of a database, and the database is changed to add additional data elements, the "hard-coded" data conversion program must be modified to comprehend and properly convert these new data elements. This process of rewriting and modifying data conversion programs can be tedious, expensive, and time consuming, as the data conversion program must be modified to comprehend the new data format(s) and element(s) and to know how to properly convert the data elements into the correct formats. Maintenance expenses for such proprietary code can be very high. Further, such "hard-coded" programs are useless for any purpose except for that which they have been written. Therefore, different data conversion needs must be met independently and without benefits from previous solutions.

There are data conversion tools configured to automate portions of a data conversion process and configured to be portable across different needs. However, most of these tools use proprietary scripting languages that are interpreted. This results in a slow execution. When handling very large conversions, using the tools instead of hard-coding may result in extra days of downtime processing that may result in downtime costs in the millions of dollars.

Further, the tools may be unable to handle more complex conversions. For example, the tools may be unable to handle very large flat files, or may be incompatible with a custom designed or uncommon database. Also, the tools may be insufficiently powerful and adaptable to convert data to an ideal state as would be desired by an enterprise. Still further, enterprises are required to purchase licenses to the tools for several hundred thousand dollars with maintenance costs typically starting in the tens of thousands of dollars.

For dissimilar computers that are connected by client-server architecture, modifying data conversion programs is especially tedious and time consuming. Many networks have "client-server" architectures that allow many clients to connect to one or more servers. Such architecture brings many benefits, such as centralized control, enhanced interconnectivity, increased flexibility and more user empowerment. Further, because servers are typically much faster, more powerful, and have greater storage space than clients, servers tend to outperform clients, especially when using programs that involve complex calculations or tremendous amounts of data. However, the above listed benefits come at a cost of increased need and complexity of data conversion. Each program, operating system, hardware device, and storage system included within the "client-server" architecture also typically requires some form of data conversion to properly meld with the entire system. As server systems may become quite complex, the data conversion needs and complexities may increase exponentially. Further, as the user base increases, there is an exponential increase in the likelihood over time that user needs will change and necessitate changes in data format or data types.

For example, having airline ticket information stored on a server allows ticketing agencies around the world to determine which seats are open for which flights. These agencies may all be using very different computer systems, but must all be capable of interpreting the data stored and managed by the server. Therefore, when the client (ticketing agency) calls a server (or Application Programming Interface, or API), the server or API will typically return a set of values.

For instance, if the program is returning a list of available seats on an airline flight, the number of seats can vary from zero (the plane is fully booked) to the capacity of the plane (there have been no seats sold). This may be even more complex where the seats are divided into categories such as isle or window seats, first and second-class seats, the type of dinners available, etc. The data conversion program must understand these varying data types and be able to interpret between the client and server. This may be complicated further wherein a component of the system may add security to the data, such as encryption or data boundaries (extraneous data at an end of a data set used to ensure an entire data set is transferred).

When the data format changes, for example adding a new class of seats, a new category such as laptop enabled seats, seats close to emergency exits, special needs seats, etc., then the "hard-coded" data conversion program must be modified to include the new categories. Thus as an enterprise may develop new strategies, needs, equipment, etc., these may have an impact on the data used by the enterprise. Adapting "hard-coded" data conversion programs to these changes can be very costly and complex.

These costs and complexities may be even more pronounced where an enterprise, such as an airline, may merge with another enterprise using a substantially different computing system and set of databases. These costs may be pronounced even further if there are legacy computing systems and sets of data that are difficult to use, such as where the data is stored as a very large flat file of an unknown format or is stored on a mainframe.

Further, current systems and methods of performing data conversion fail to address needs in the business community wherein current methods and systems may require purchasing a very expensive tool, such as but not limited to a conversion suite, may require long term agreements between data conversion providers and data conversion consumers, may require the onsite presence of tools, and/or may be unable to adapt to specific needs of consumers without significantly damaging other business models, thereby restricting data conversion providers to only select groups of consumers.

SUMMARY OF THE INVENTION

From the foregoing discussion, it should be apparent that a need exists for an apparatus, system, and method for decentralized data conversion. Beneficially, such an apparatus, system, and method would allow a data conversion provider to supply tools to data conversion consumers efficiently.

The present invention has been developed in response to the present state of the art, and in particular, in response to the problems and needs in the art that have not yet been fully solved by currently available data converters. Accordingly, the present invention has been developed to provide an apparatus, system, and method for decentralized data conversion that overcome many or all of the above-discussed shortcomings in the art.

The apparatus for decentralized data conversion is provided with a plurality of modules configured to functionally execute the necessary steps of converting data. These modules in the described embodiments include a data get/put module configured to receive a data source over a network, extract source data from the data source to form extracted data, and return converted data over a network. The apparatus may also include a data duplicator module configured to transform the extracted data to form converted data adapted to a target, the data duplicator module comprising one or more integration objects configured to perform conversion steps, the integration objects in a hierarchical structure defining an order of execution. Additionally, the apparatus may include an interface module configured to transmit a representation of the one or more integration objects over the network for display in the hierarchical structure, and receive input from a user such that the hierarchical structure of the one or more integration objects may be modified by the user.

The network of the apparatus, in one embodiment, may be the Internet. In another embodiment, the apparatus may further comprise a web browser-readable interface. The apparatus may further include a payment gateway module configured to receive a payment from a user. In one embodiment, access to the data duplicator module may be enabled in response to receiving a payment from a user.

The apparatus is further configured, in one embodiment, to include a drag and drop capability for modifying the hierarchical structure of the integration objects. In a further embodiment, the data duplicator module may be written in machine language. In yet another embodiment, the apparatus may include a documentation generation module configured to generate documentation of a configuration of the decentralized data conversion apparatus by reading the integration objects and writing a data mapping document.

The apparatus, in another embodiment, may include comprising a packager module configured to provide a unified interface for the modules of the apparatus. The modules of the apparatus, in one embodiment, may be contained in a single file. In another embodiment, the apparatus may include a data cleanse module configured to modify data in the source data for better compliance with the target. In yet another embodiment, the interface module of the apparatus may be customizable such that a brand of a third party is displayed by the interface module.

A computer program product comprising computer readable medium having computer usable program code programmed for decentralized data conversion of the present invention is also presented. The operations of the computer program product may be embodied by receiving a payment from a user through a payment gateway module, receiving a data source over the Internet, transforming data in the data source to create converted data adapted to a target, the transformation directed by one or more integration objects configured to perform conversion steps, the integration objects in a hierarchical structure defining an order of execution, and returning the transformed data over the Internet.

The computer program product may further include cleansing data through a data cleanse module, cleansing data comprising modifying data in the data source for better compliance with the target. Additionally, payment in the computer program product may comprise one-time payment such that the payment enables a predetermined number of transformations. In another embodiment, payment in the computer program product may comprise a term payment such that the payment enables one or more transformations of one or more data sources over a period of time.

A method of the present invention is also presented for decentralized data conversion. The method in the disclosed embodiments substantially includes the steps necessary to carry out the functions presented above with respect to the operation of the described apparatus and computer program product. In one embodiment, the method includes providing a server configured to be accessible over the Internet, receiving a payment from a user through a payment gateway module, the gateway module operated by the server, receiving a data source over the Internet into the server, transforming data in the data source to create converted data adapted to a target, the transformation directed by one or more integration objects configured to perform conversion steps, the integration objects in a hierarchical structure defining an order of execution, the transformation controlled by the server, and returning the transformed data over the Internet from the computer server.

In a further embodiment, payment in the method comprises a one-time payment such that the payment enables a predetermined number of transformations. In an alternate embodiment, payment in the method comprises a term payment such that the payment enables one or more transformations of one or more data sources over a period of time. In a further embodiment, the term payment is periodic such that the payment recurs every term.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
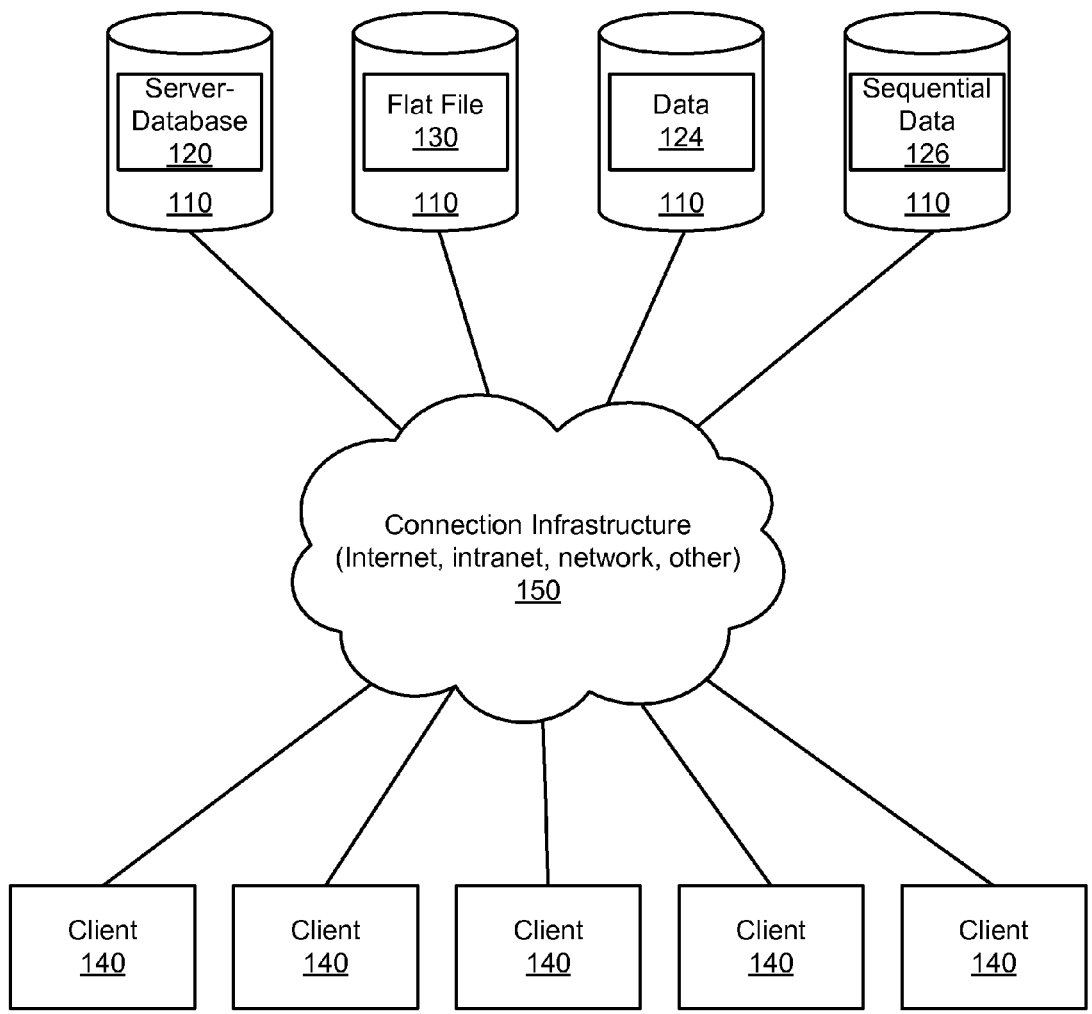
FIG. 1 is a schematic block diagram illustrating an exemplary client/server system.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts a schematic block diagram illustrating an exemplary client/server system. There may be a server 110 or multiple servers, or other media 110 such as storage media, programs, websites, etc., which may be functionally connected 150. The server 110 may hold information such as, but not limited to, in the form of a database 120, flat file 130, data 124, and/or sequential data 126. There may be a database 120, flat file 130, data 124, and/or sequential data 126 stored in other than a server. For example, sequential data 126 may be a feed coming from a program. There may be a client 140 or multiple clients 140 that may be functionally connected to the server 110. Connectivity 150 among servers 110 and clients 140 may be by any known means for communicative connectivity between computer devices, such as but not limited to intranet, internet, network, and/or direct connections.

In operation, a server may contain and/or manage data. The data may be in the form of a database 120 or a flat file 130. A database 120 or flat file 130 may be spread over several servers 110. Further, a server 110 that may manage the data may be different from a server 110 that stores the data. A user may have access to the data through a client 140. Thereby a user may add data, remove data, and/or otherwise manipulate data.

There may be more than one set of data. There may be more than one set of servers 110 and clients 140. There may be a first set of data having a first data scheme and a second set of data having a second scheme. The first and second sets of data may be on the same or different servers 110 and that may be accessible by the same or different clients 140. There may be reason to combine the first set of data with the second set of data. A desirable result of such combination may be that either set be converted to the scheme of the other or to a third scheme and inserted therein. Such a conversion may be managed by a server 110 or by a client 140. Such a conversion may take place over connectivity 150 such as an internet or intranet or other connection between the pertinent devices, or may take place entirely within a computing device such as a single server.

Figure 2:
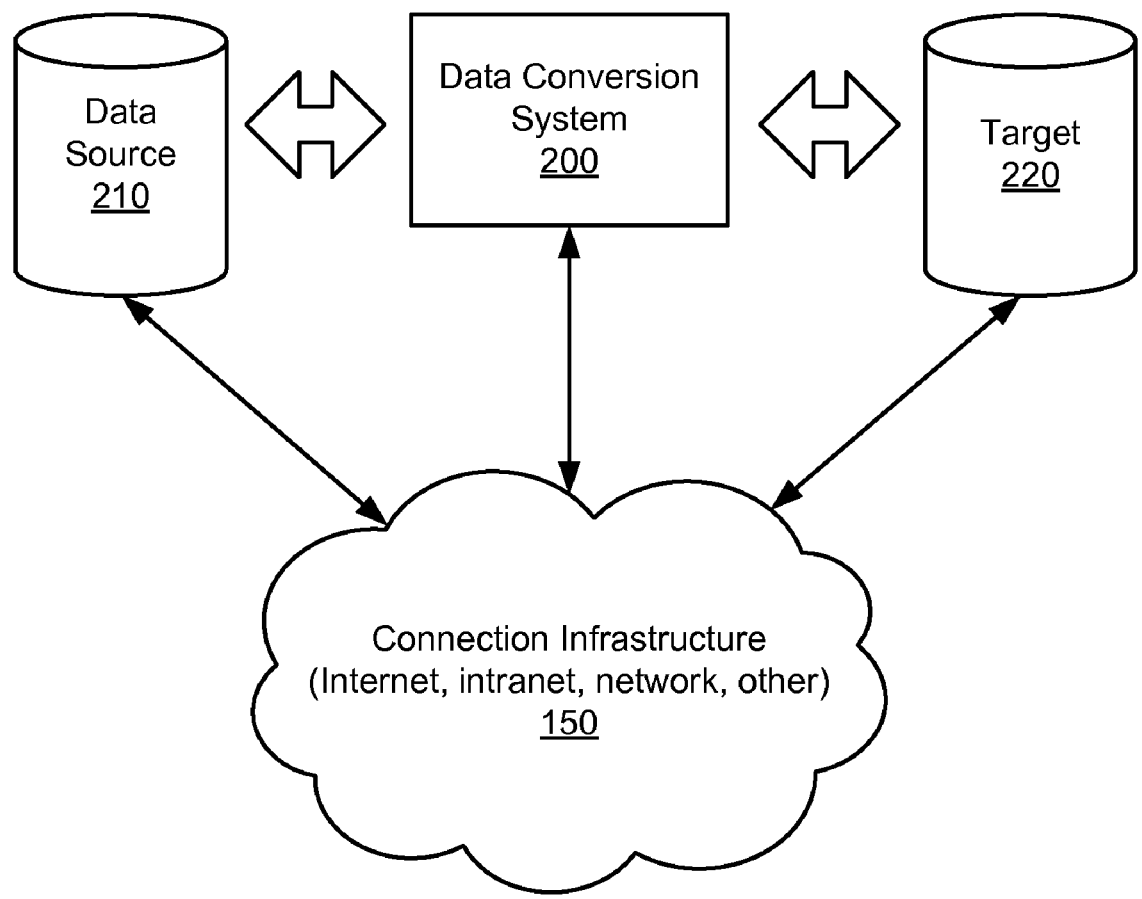
FIG. 2 is a schematic block diagram illustrating data conversion according to one embodiment of the invention.

Turning to FIG. 2, there is a schematic block diagram illustrating data conversion according to one embodiment of the invention. There may be a data source 210 having source data such as a database 120 (see FIG. 1) or flat file 130 (see FIG. 1) stored on a server 110 (see FIG. 1). The data source 210 may contain data in a source scheme. There may be a target 220 that may be a database 120 or a flat file 130. The target 220 may only exist as a desired result. For example, it may be desired to wholly create a standardized database 120 from a flat file 130. The target 220 may contain target data in a target scheme that may differ from the source scheme.

For example, the data source 210 may be a flat file 130 stored on a first server in a unique and proprietary scheme that may have been designed to accommodate particular needs of a growing enterprise. The target 220 may be a standardized database adapted to suit current needs of the enterprise. It may be desired to bring data from the data source 210 to the target 220 such that the enterprise may adopt use of the standardized database. Therefore, there may be a data conversion system 200 configured to convert data from the data source 210 to the target 220.

The data conversion system 200 may be configured to extract source data from the data source 210 and convert it from the source scheme to the target scheme. The data conversion system 200 may return converted data. In one embodiment, the data conversion system 200 may insert the extracted and converted data into the target 220. Also, a data conversion system 200 may be configured to convert in more than one direction. For example, a data source 210 may also be a target 220 and a target may also be a data source 210. Thereby, there may be data conversion in more than one direction as data may be extracted from both, converted from both schemes to both schemes, and inserted in both.

Additionally, data conversion may be a single batch process, wherein data is converted only in a single batch sufficient to address the entire need for conversion. Thereafter, an enterprise may cease using a source. Alternatively, data conversion may be a continuing process, whereby data may be converted in real-time or near real-time from one or more sources to one or more targets preferably according to a regular schedule such as every five minutes. Thereby a data source 210 and a target 220 may be integrated, wherein data from a data source 210 may be continually updated into a target 220. For example, a data source 210 may be a repository for a data entry process that may also contain sufficient data to populate a target 220. A second data entry into the target 220 may be automated by integrating data from certain records and fields from the data source 210 into the target 220 through a data conversion system. The data conversion system 200 may be portable between different servers, clients, and schemes. Thereby the same data conversion system 200 may be used to perform data conversion for an unlimited number of data conversion needs.

In one embodiment, the data source 210, the data conversion system 200 and the target 220 communicate over a connection infrastructure 150 (see FIG. 1). The connection infrastructure 150 may comprise a network, the Internet, an intranet, a direct connection, or the like to enable communication between elements of the system. For example, the data source 210 may be supplied to the data conversion system 200 over the Internet, and the data conversion system 200 may transform data from the data source 210 and return converted data to the target 220 via a network connection.

Figure 3:
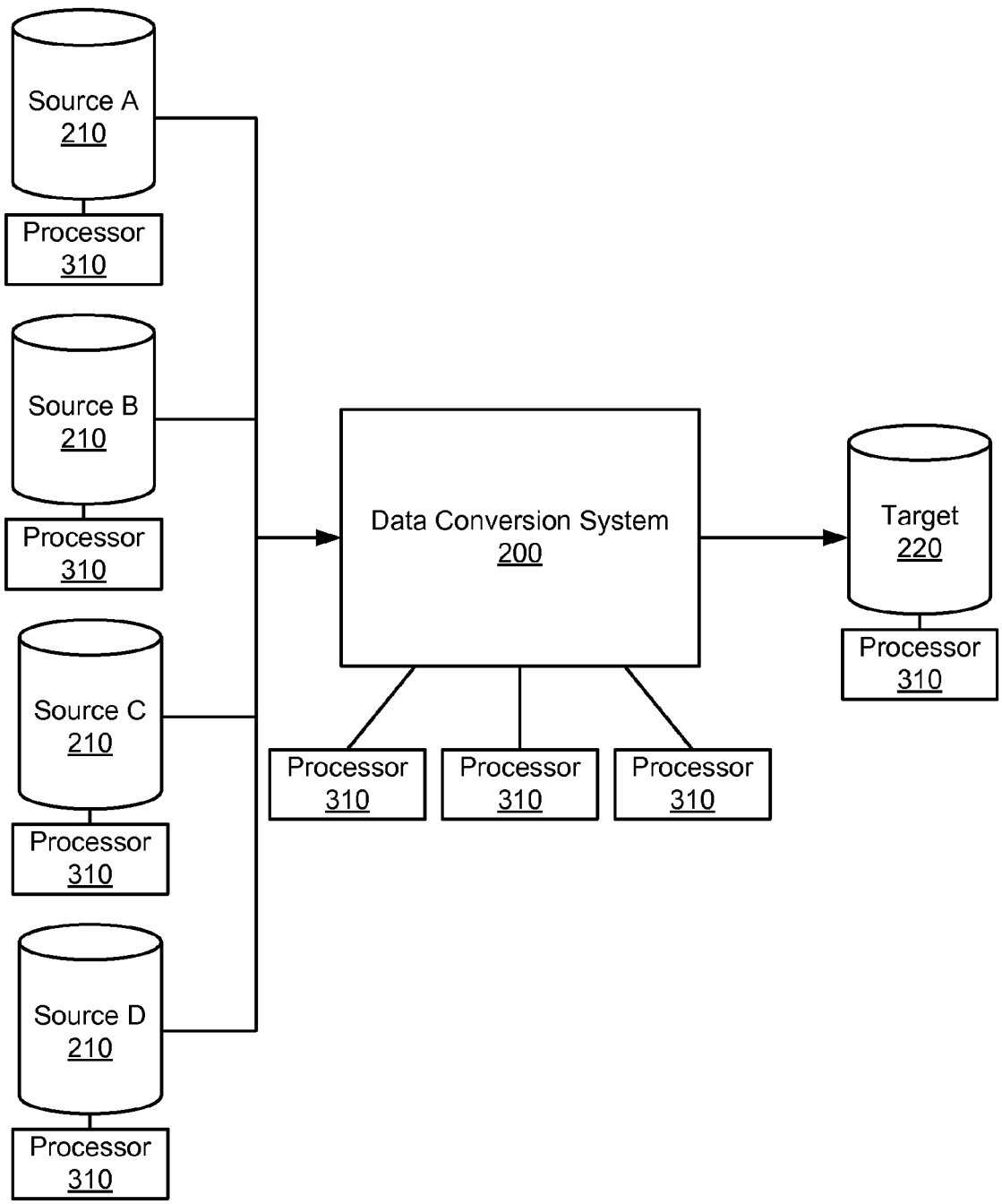
FIG. 3 is a schematic block diagram illustrating a data conversion system extracting from multiple sources according to one embodiment of the invention.

Looking to FIG. 3, there is shown a schematic block diagram illustrating a data conversion system extracting from multiple sources according to one embodiment of the invention. There may be a data conversion system 200 that may be in control of one or more processors 310. These processors 310 may be in one or more devices such as computers belonging to an enterprise. For example, the data conversion system may have access to multiple computers and may have an ability to direct those computers to perform conversion steps. Also there may be a plurality of sources 210 that may have one or more processors 310. Further, there may be a target 220 that may have a processor 310. In addition, a single device may operate a plurality of processors 310, such as a symmetric multiprocessor (SMP) computer.

In operation, the data conversion system 200 may control one or more processors 310 external to the source(s) 210 and target 220. These processors 310 may be used in parallel to perform a conversion quickly and efficiently. For example, the data conversion system 200 may be coupled to a plurality of processors 310, wherein the data conversion system 200 may divide conversion work into portions that may be independently handled by each processor 310 and then reported back to the data conversion system 200.

The data conversion system 200 may extract source data from the plurality of sources 210 and may convert the source data by using one or more processors 310. In particular, the data conversion system 200 may perform one or more conversion steps using a processor 310 associated with one or more of the plurality of sources 210. Because server processors typically must be relatively powerful, it is preferable to perform as much of a conversion as possible using processors 310 associated with servers 110. Further, wherein a data source 210 is a database, it may be preferable to perform some data conversion steps using database management tools of the source(s) 210.

Also, a target 220 may be associated with a server 110 that may have a processor 310. Data conversion steps may be preferably performed using the processor 310 associated with the target 220 where such would provide an advantage. For example, wherein the source(s) 210 may be flat files and a target 220 may be a sophisticated and powerful database, it may be advantageous to insert extracted data from the source(s) 210 into the target 220 and then perform conversion steps utilizing as many data management commands of the target database program as is most efficient.

Figure 4:
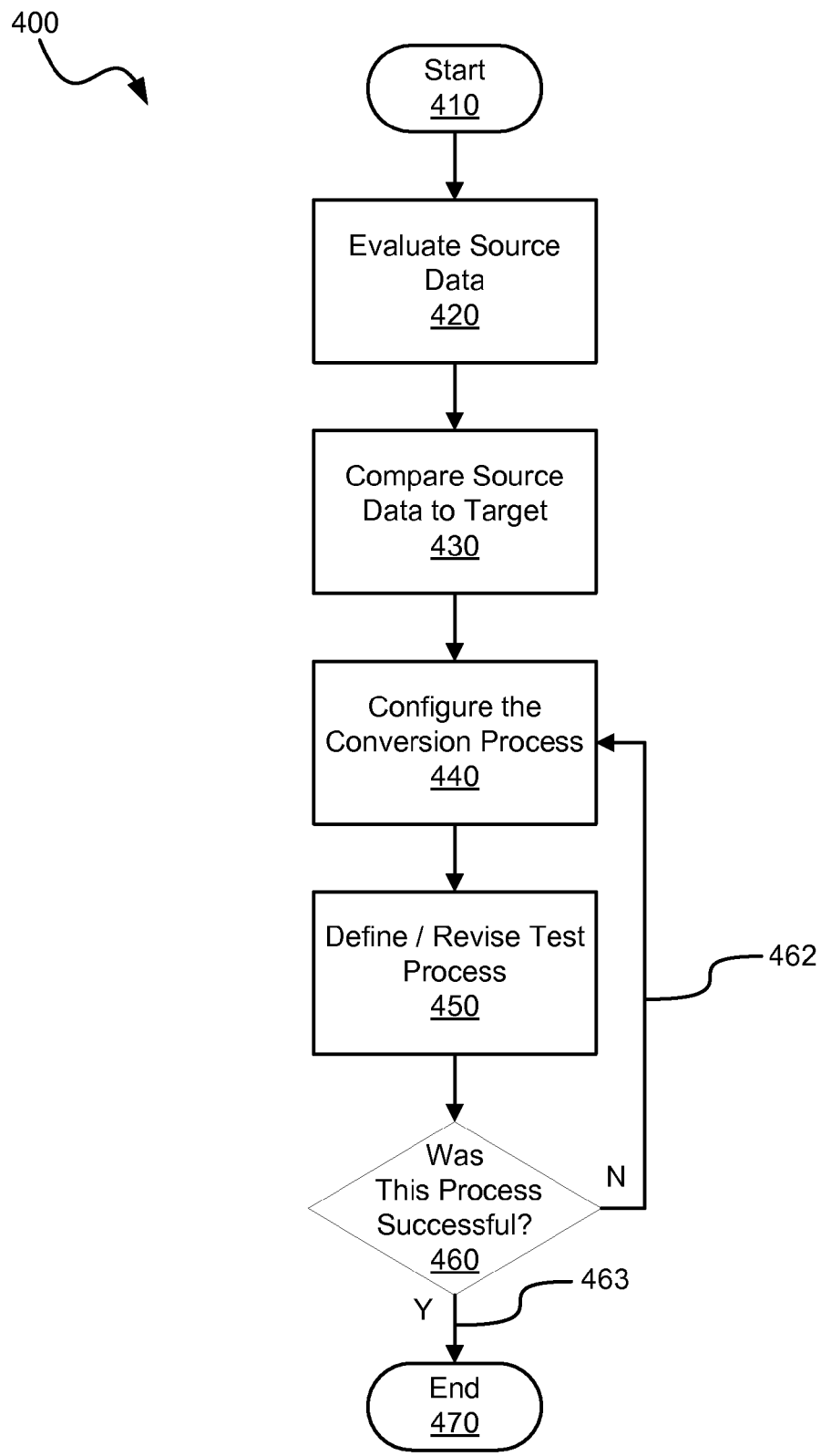
FIG. 4 illustrates a flow chart displaying a data conversion configuration method according to one embodiment of the invention.

FIG. 4 illustrates a flow chart displaying a data conversion configuration method according to one embodiment of the invention. Source data should be evaluated 420 preferably to determine structure and contents. This may be particularly difficult where source data may be in a nonstandard format or may not be a database. The source data should be examined for patterns, contents, variations on patterns, etc. thereby developing an understanding of how the source data is structured and how it may be extracted and/or used.

The structure and contents of the source data should be compared 430 to the target. Content sufficiency of the source should be established; else additional sources may need to be included. For example, wherein the target may require a list of children of an employee and a source does not include such information, it may be necessary to include a further source having such information. Data structure should be compared to determine what steps may need to be performed to transform/clean the source data sufficiently to properly prepare it for insertion into the target.

The conversion process should be configured 440 according to determined conversion needs. The tools used should be adapted for use with the source and target and prepared to perform the steps needed to convert the data. Then the process should be defined/revised 450 according to the configuration and any previous conversion results.

As the process is carried out, or upon completion, an evaluation should be made 460 as to the success of the conversion process. Where the process successfully completes 463 the goals of the conversion, the conversion is completed and may end 470. Where the process does not successfully complete 462 one or more goals of the conversion, the conversion should return to the configuration step 440 for additional configuration on accordance with the failure to meet one or more goals of the conversion process.

Figure 5:
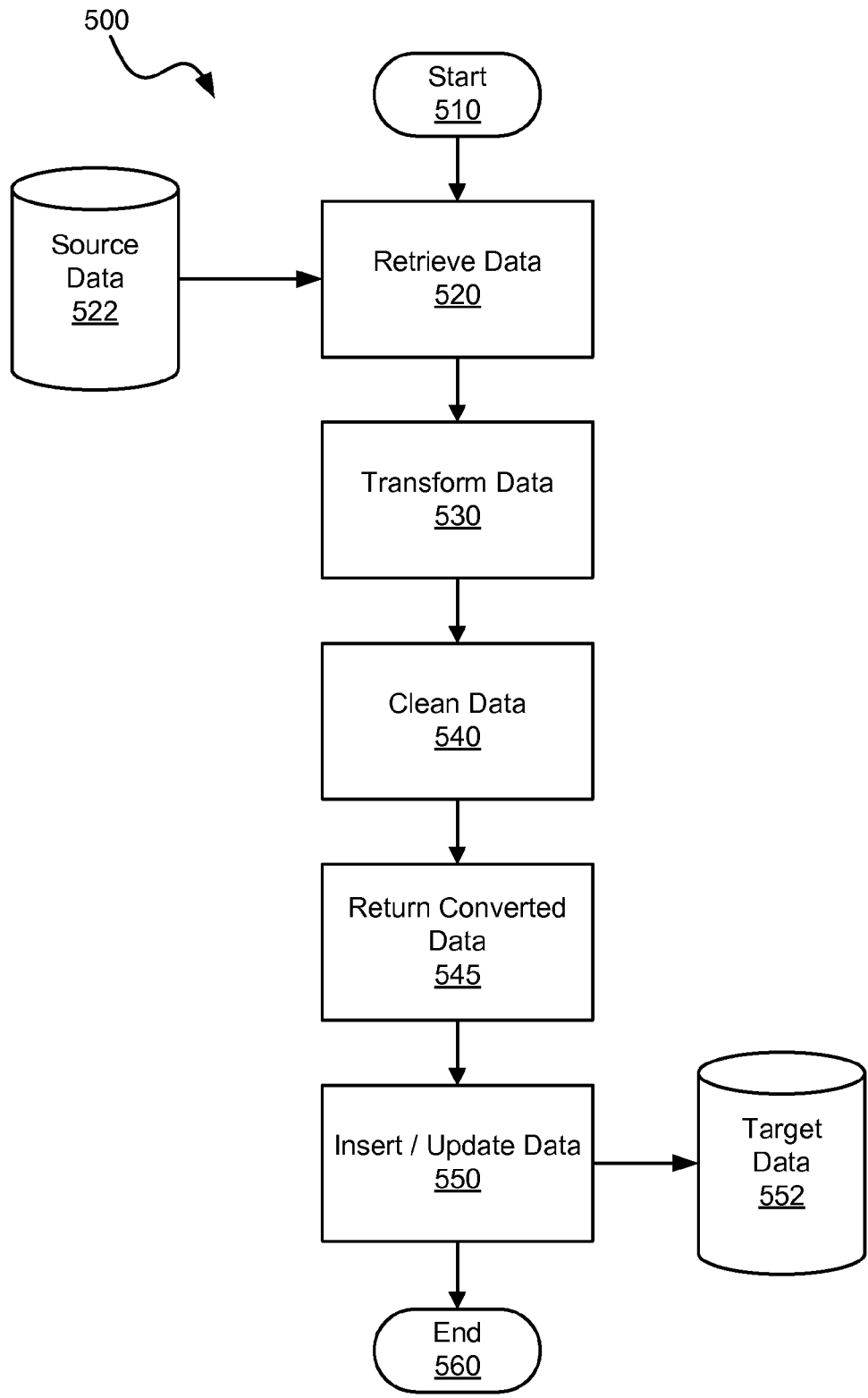
FIG. 5 illustrates a flow chart displaying data conversion according to one embodiment of the invention.

FIG. 5 illustrates a flow chart displaying data conversion according to one embodiment of the invention. Wherein it is desired to convert Source Data 522 to Target Data 552, a data conversion may take place. Source Data 522 may be retrieved 520 for use in the data conversion process. Retrieval 520 of Source Data 522 may be retrieved simply by issuing appropriate database command; or it may be complicated as negotiating streaming of the data from a source and interpreting the data after evaluating its structure and format. In one embodiment, retrieval 520 of data may comprise receiving data over a network connection, such as an Ethernet connection, the Internet, an intranet, a direct connection, or the like.

The data may then be transformed 530 and/or cleaned 540. Transformation may include but is not limited to data mapping transformations. Cleaning may include but is not limited to formatting data, including formatting data that may not be appropriately formatted for both the data source 210 and the target 220.

Converted data may then be returned 545. In one embodiment, returning 545 converted data may comprise delivering a file for manual insertion into a data target by a user. In another embodiment, the returning 545 data comprises delivering converted data to an agent configured to insert the converted data into a target. In one embodiment, the converted data may be returned 545 over a network connection, such as an Ethernet connection, the Internet, an intranet, a direct connection, or the like.

When the data is in proper form it may be inserted/updated 550 as Target Data 552. Insertion may be simple or complicated in ways similar to retrieval 520. In one embodiment, inserting/updating 550 data comprises transferring data over a network connection, such as an Ethernet connection, the Internet, an intranet, a direct connection, or the like. Wherein the insertion is complete, the process is finished 560.

Each of the steps may be performed by the same or different modules on the same or different processors. Preferably the data is transformed 530 before it is cleaned 540. Further, wherein the conversion is part of an integration, the steps may be repeated indefinitely to provide real time or near-real time conversion of data.

Figure 6:
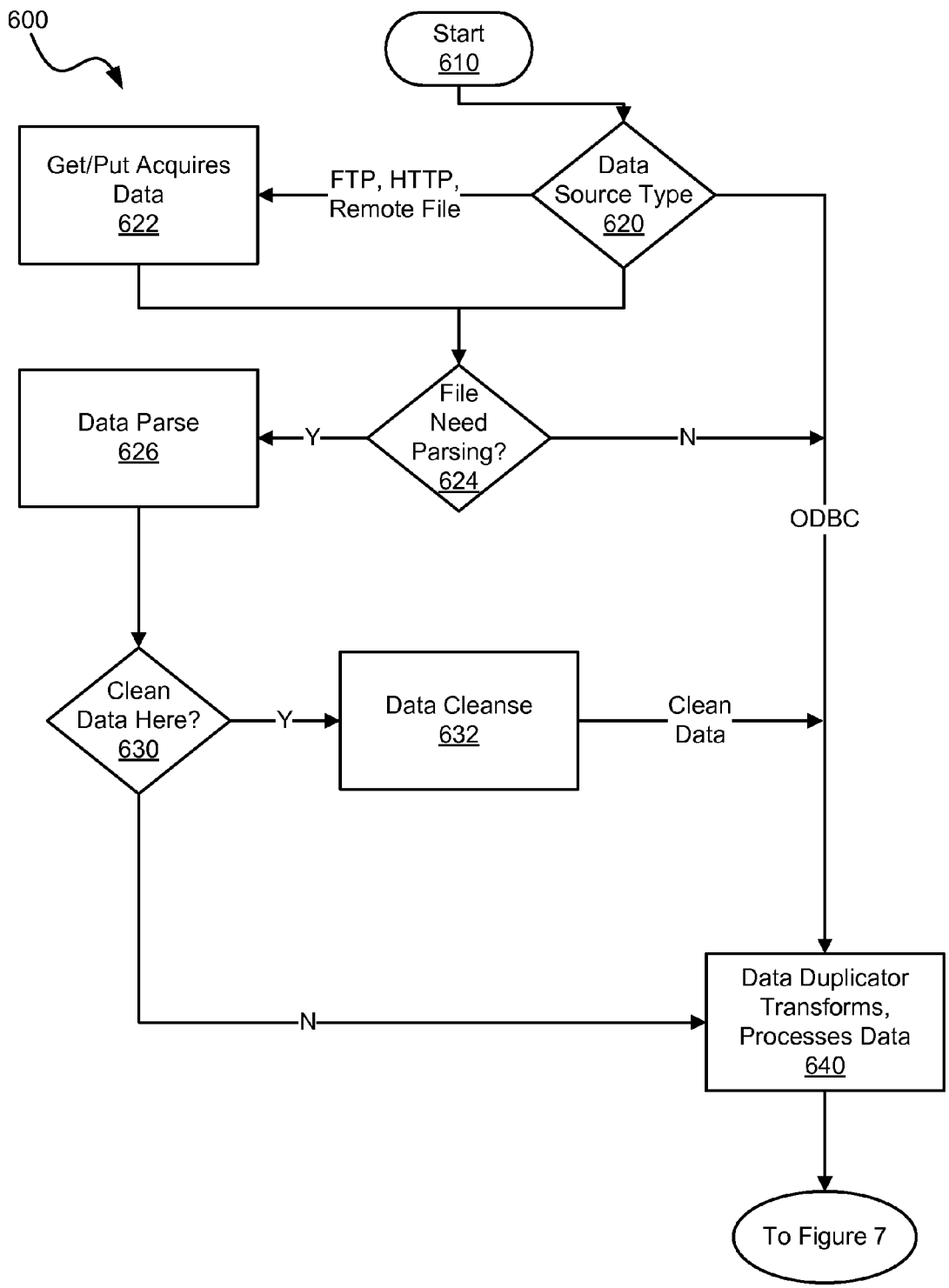
FIGS. 6-7 illustrate a detailed flow chart displaying a data conversion method according to one embodiment of the invention.
Figure 7:
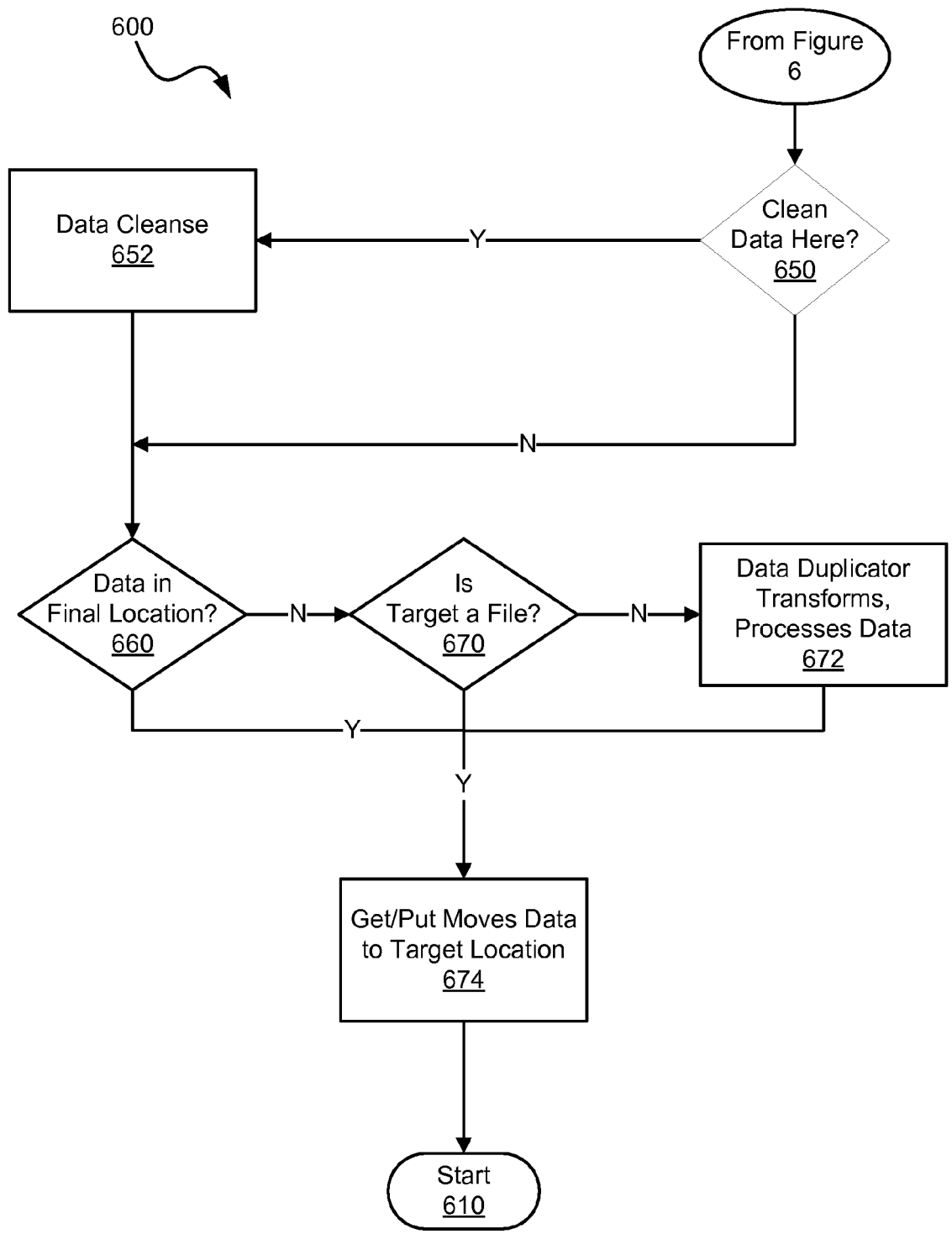

FIGS. 6-7 illustrate a detailed flow chart displaying a data conversion method according to one embodiment of the invention. When beginning 610 data conversion, the data source type should be evaluated 620. Where the data source type requires special access such as where the data source is a remote file and/or best accessible by FTP or HTTP, it is preferred to use a Data Get/Put module to retrieve 622 the data. If the Data Source type is an ODBC (Open Database Connectivity) type source, then it may be directly retrieved and transformed 640.

Data retrieved 622 via a Data Get/Put module and local file data that is not ODBC should be evaluated for parsing needs 624 and if the data should be parsed then it may be parsed 626 by a Data Parse module. Where the data need not be parsed it may be transformed and processed 640 by a Data Duplicator module. After non-ODBC data is parsed, it should be determined if the data should be cleaned 630. Where the data should be cleaned it may be cleaned 632 by a Data Cleanse module; then it should be transformed and processed 640 by a Data Duplicator module.

Upon completion of transformation and processing 640 the data should be evaluated 650 for any cleansing needs and should be cleaned 652 by a Data Cleanse module should it be determined there be sufficient need. The data should also be evaluated to determine 660 if the data is in its final location (the location where the data is intended to reside as target data). If the data is in its final location then the method may end 680. If the data is determined 660 to not be in its final location then the data should be evaluated 670 as to its status as a file. If the data is a file a Data Get/Put module should move 674 the file to its final location and then the process may end 680. If the data is not a file, the data should be further processed and transformed 672 into its final location, preferably by a Data Duplicator module, wherein the process may end 680.

Figure 8:
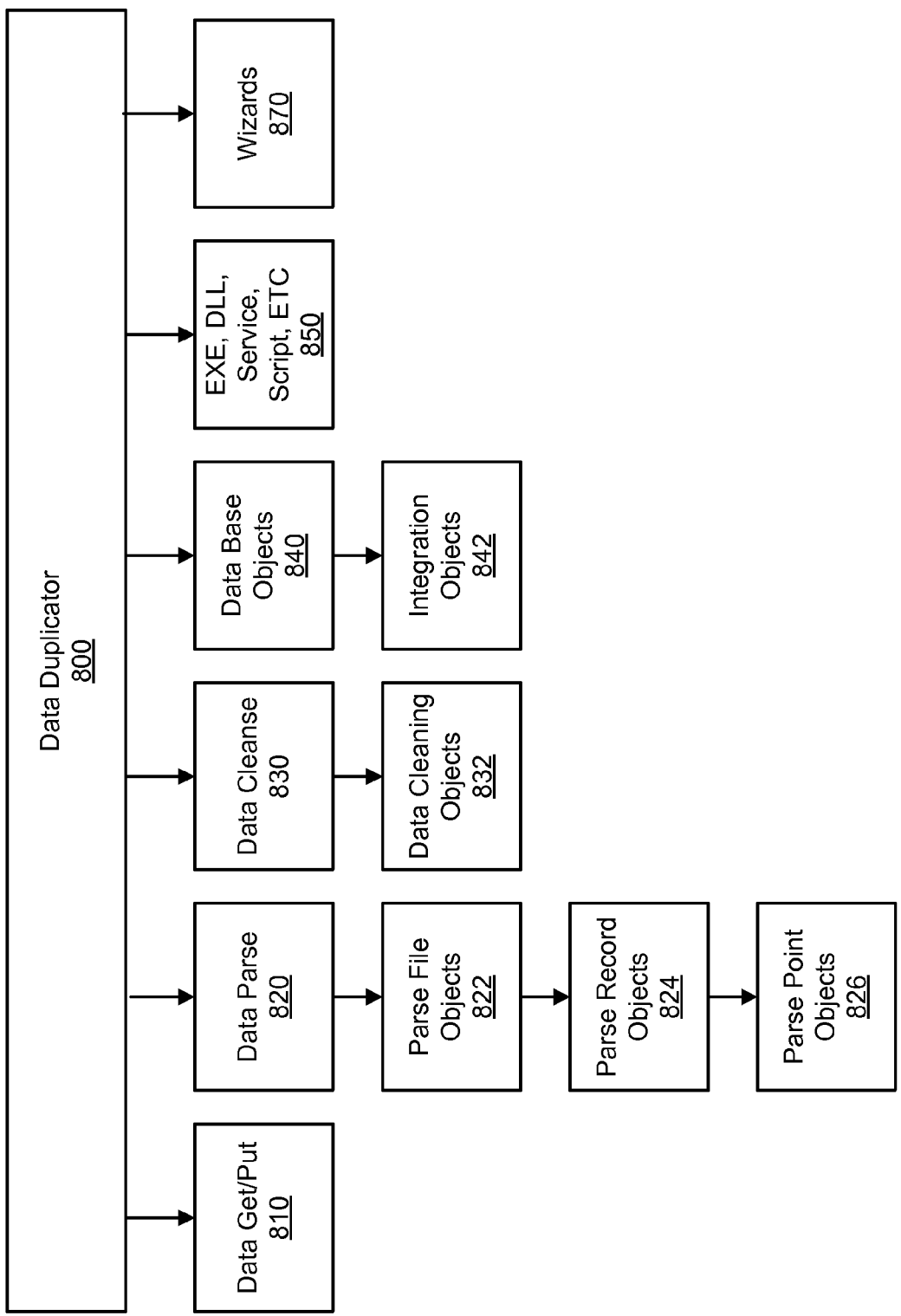
FIG. 8 illustrates a control structure for a data conversion system according to one embodiment of the invention.

FIG. 8 illustrates a control structure for a data conversion system according to one embodiment of the invention. There is shown a Data Duplicator module 800 that may be configured to call subordinate instruction sets, such as but not limited to Data Get/Put modules 810; Data Parse modules 820; Parse File Objects 822; Parse Record Objects 824; Parse Point Objects 826; Data Cleanse modules 830; Data Cleaning Objects 832; Database Objects 840; Integration Objects 842; executables, DLLs, Services, Scripts, etc. 850 and/or wizards 870. The Data Duplicator module 800 may serve as a backbone for all other data conversion modules, processes, objects, and steps. The Data Duplicator module 800 may manage utilization, control, and flow of one or more steps of a data conversion process.

In operation, a user may configure the Data Duplicator module 800 to call modules, executables, objects, DLLs, worksheets, and/or wizards, etc., according to a hierarchy defining an orderly carrying out of a conversion process. The Data Duplicator module 800 may be configured to allow a user to call subordinate instruction sets during a configuration of the Data Duplicator module 800. For example, an SQL Worksheet may be called by a user to help debug an Integration Object 842 or to determine an optimum command to include in the data conversion process.

Data Get/Put 810 may be used to download/upload data over TCP/IP, or similar, connections. The Data Get/Put module 810 may be configured to pull data over FTP, HTTPS, and/or HTTP connections, thereby permitting access to data that would otherwise not be available over the network. There may be included support for passwords and/or encryption.

There may be wizards 870 associated with and/or integral to one or more modules, such as a Data Duplicator module 800. Wizards 870 may be configured to perform repetitive tasks such as creating and naming Integration Objects 842 in relation to data fields. Wizards 870 may be included and configured to evaluate migration steps and estimate their chance of success. Wizards 870 may be configured to perform common SQL statements such as but not limited to Selects, Counts, and Duplicate Checking on a field. Further, wizards 870 may be configured to provide speed verification of data and/or serve as an ad hoc reporting tool.

A module may be a wizard 870, for example, a Data Cleanse module 830 may be a wizard 870. There may be a wizard 870 configured to build objects for a database 120. There may be a wizard 870 configured to build SQL scripts. There may be a wizard 870 configured to build documentation. There may be a wizard 870 to check field integrity. There may be a wizard 870 to check database connections. There may be a wizard 870 configured to populate portions of a module, such as an Integration Object 842, with metadata. There may be a wizard 870 configured to build SQL for portion(s) of a module, such as an object for a Data Duplicator module 800. Wizards 870 may be toolbar wizards 870 that may affect a whole script or process. Wizards 870 may be popup menu wizards 870 that may be configured to affect a currently selected portion of a module, such as an Integration Object 842 for a Data Duplicator module 800.

For example, a "Build objects for Database" wizard may perform or may allow a user to: select one ore two ODBC compliant databases to read metadata from (including text databases created by Data Parse); supports Insert, Update, and Delete objects; auto-match on table names, or allow the user to match tables as they see fit; allow for Left to right, and/or Right to left objects to be created; auto-match field names, and allow the user to override, or select fields that will be mapped.

Also, for example, a "Builds the Objects" wizard may build field listings from the metadata, and build Selection SQL (if source is an ODBC Compliant DB). Still more, for example, a Build SQL Scripts wizard may step through objects and rebuild an SQL for a Selection SQL (This may be useful if a user adds many joins after the wizard has run.) Still even more, for example, a "Build Documentation" wizard may step through objects loading filed mappings and may save out a CSV file with all the mappings currently in the script and/or process. Also, for example, a Check Fields Integrity wizard may use metadata of a Target database to determine the likelihood of success for each step. Likelihood may be determined by visual cues, such as color. For example, colors may indicate the following Criteria: Green: All Fields in the target database are being assigned data, and the format is compatible (Strings=Strings . . . ); Yellow: All required fields are being assigned data and compatible field types are being assigned (String=Integer); and Red: Required fields are not being populated, or incompatible types are being assigned (Date Time=BLOB). Additionally, for example, a Check Database Connections wizard may connect to a database to make sure a user has a connection. (Useful if a user has not connected from a location before, before using the other wizards). Still also, a Populate with Metadata wizard may read a Database, if possible, and place field names in a Fields Properties for a selected object. (This may eliminate lots of time consuming typing, and the typos that come with it). Still also more, a Build SQL for this object wizard may use Metadata stored in an object to build SQL for selection. This may assume that fields in two properties for left and right database have been aligned so that the first field goes into the first field and so on through all the fields. Extra fields in the source tables may be left out of the Select.

There may also be a documentation generation module, or wizard. The documentation generation wizard may be configured to generate documentation for conversions from machine code. For example, there may be a wizard 870 configured to create a documentation spreadsheet that documents the actual data mapping configured within a Data Duplicator module 800. Advantageously, this documentation spreadsheet tracks the actual data mapping instead of intended data mapping, therefore a user of the spreadsheet may rely on the accuracy thereof. The wizard may read through all the integration objects and thereby write a data mapping document.

Figure 9:
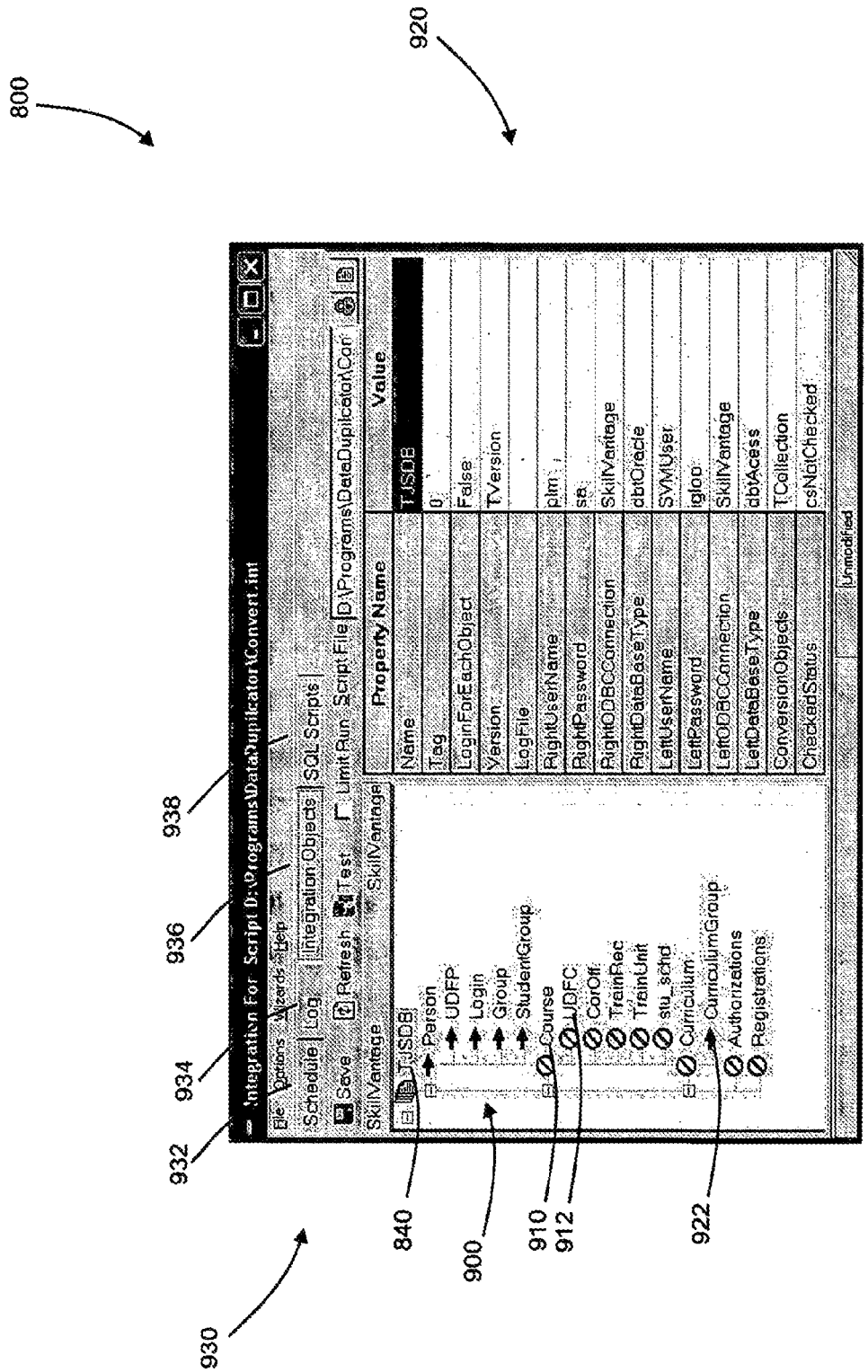
FIGS. 9-10 show an exemplary screenshot of a Data Duplicator module according to one embodiment of the invention.
Figure 10:
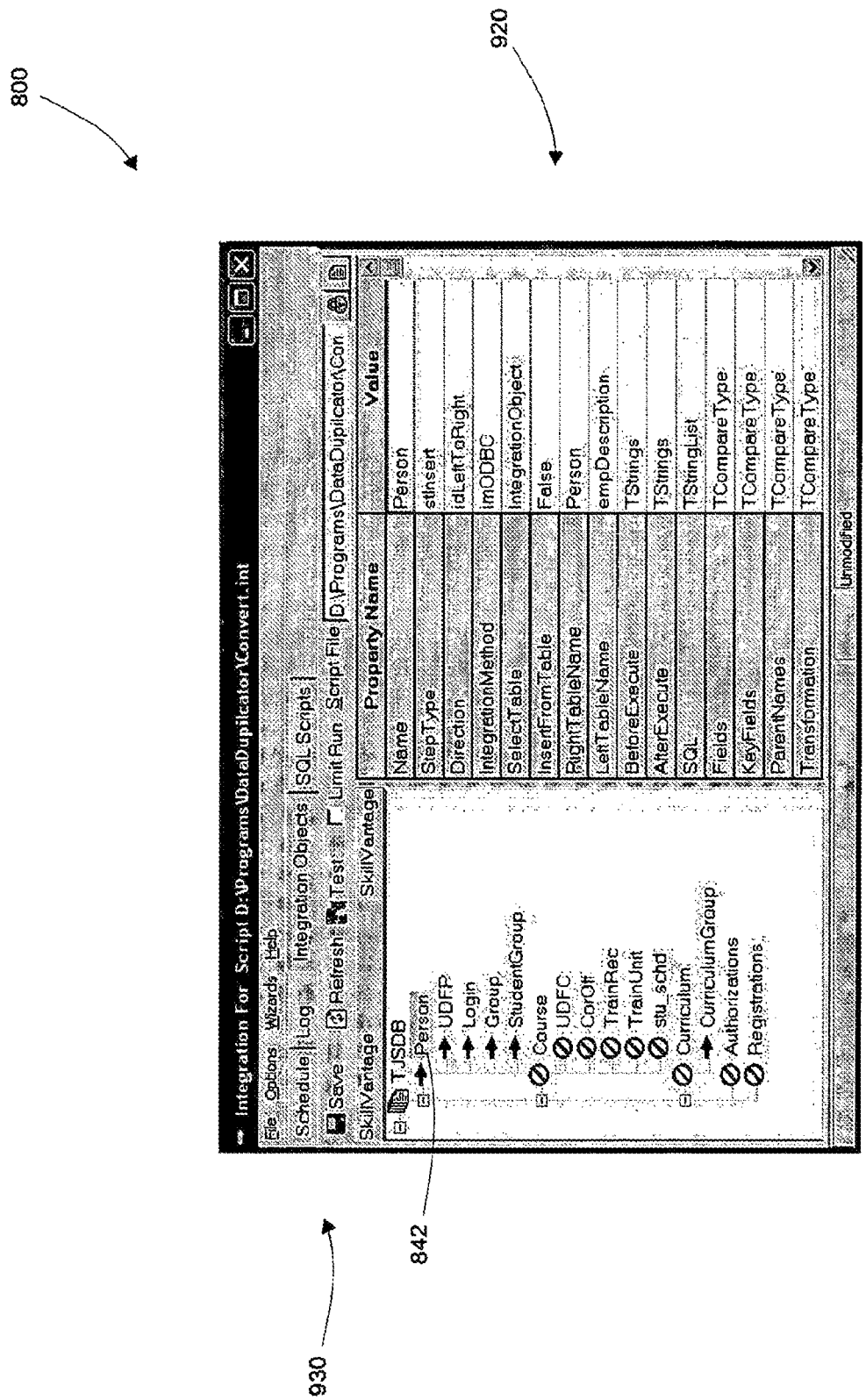

FIGS. 9-10 show an exemplary screenshot of a Data Duplicator module, or data conversion module 800 according to one embodiment of the invention. In particular, FIG. 9 shows a screenshot wherein a database object, or base object 840 is selected and FIG. 10 shows a screenshot wherein an integration object 842 is selected. The Data Duplicator module 800 may be used to manage conversion of data from a data source 210 (see FIG. 2) to a target 220 (see FIG. 2). Also, the Data Duplicator module 800 may be used to build, test, and cause to be executed steps of data conversion 200 (see FIG. 2). More, the Data Duplicator module 800 may be written in machine language/binary for the purpose of greatly enhancing speed and efficiency. Additionally, the Data Duplicator module 800 may function as a management module, organizing and directing the steps required to convert data from a data source 210 to a target 220.

The Data Duplicator module 800 may create, manage, and control Integration Objects 842, described in more detail later in the specification. There may also be included the ability to call and control other modules, such as Data Get/Put 810 (see FIG. 7), Data Parse 820 (see FIG. 7), and Data Cleanse 830 (see FIG. 7). Further, there may be included the ability to call and control other files including but not limited to file types EXE, DLL, Active X Controls, OCX, Service, Scripts, and ODBC (SQL Server, Oracle, My SQL, Access, stored procedures, macros, other features provided by an ODBC manufacturer, etc.).

Within the Data Duplicator module 800 there may be a hierarchical design 900 that may be graphical and may include drag and drop capabilities. This design may be a tree structure 900 wherein portions, such as objects, such as Integration Objects 842, of the structure may be organized in a sequence. Further, portions of the structure may be interrelated. For example, objects may be related to subordinate/owned/children objects. Thereby objects may be structured into groups and/or families. Subordinate Objects, or Children 912, may depend from Parent Objects 910. Utilization of a Child 912 may depend on utilization of a Parent 910. Further, status, such as but not limited to completion status, of a Parent 910 may depend on status of one or more Children 912.

There may also be debugging tools, including but not limited to log files, step-through capabilities, status indicators, and/or error reports. Error reports and/or log files may include information regarding identification of one or more objects associated with an error, one or more Select SQL statements associated with an error, one or more Target SQL statements associated with an error, and/or any error messages provided by any programs associated in any way with the conversion.

Further, a Data Duplicator module 800, or an associated program, may be configured to graphically select and/or graphically fix errors reported in debugging tools. For example, an error log may include a reference to an object associated with an error. There may also be sufficient information to determine that the error may be corrected by adjusting a property, or properties, of the object. The object may be selected and manipulated from a Data Duplicator module, thereby correcting the property or opening an interface whereby the property may be altered. Further, error stopping may be disabled, thereby permitting conversion to continue despite errors. This may be advantageous where there are relatively few errors. For example where there may be ten million records and only five errors that each only impact a single field in a single record, it may be advantageous to complete conversion and deal with each error individually.

Further, there may be included options to save changes, lose changes, test current migration scheme, limit run process a specified number of records for debugging, open a file, and create a new file. Processes may be identified by version. A conversion process may include any number of process steps. Each step in a conversion may be represented graphically by an object on a tree 900. There may be an unlimited number of steps and/or objects. There may be options permitting pauses or "sleeping" for specified and/or calculated portions of time.

A process may be configured to be compiled into a process DLL. The process DLL may be configured to be called as an external procedure from a database. The process DLL may be configured to accept parameters defining which process or which portion of which process to run. The process DLL may be configured to accept a key by which to filter selects. For example, a trigger on a person table could call an update script that would select only that person from a source database 210 and update information in a target database 220 on another machine.

Within a process, there may be steps capable of performing one or more of the following: imports from text files, calling third party DLLs, calling an MSE engine, launching executables, running an SQL statement, running ODBC commands. SQL statements may include but are not limited to updates, inserts, inserts based on data in a target database. ODBC commands may include but are not limited to selects, transformation tables, code to check for existing records, and/or inserts.

Objects may own as many other objects as needed to form a desired logical structure. Objects may have properties 920; properties 920 may be configurable by a user. For example, the direction an object is to operate may be graphically configurable by right clicking an arrow 922 adjacent to a graphical representation of the object. The arrow 922 may include a drop down menu that may allow selection between right or left thereby determining a direction of operation. There may be a selection to determine and indicate non-operation of the object.

Objects may be configured to allow free form SQL for selects. Objects may also use wizards to build SQL for the conversion. Objects may be configured to Insert, Update, and delete SQL built automatically based on Fields, and settings of the object(s). Also, objects may be configured to join tables to build the result fields needed for a step. More, objects may be configured to use Decode and Case statements to transform fields. Still more, objects may be configured to Insert into tables while selecting keys from another table.

There may be other object properties including but not limited to: name; data type; version; conversion object collection; right/left connection DSN, usernames, passwords, and database types; optional events to be called when a record is processed; integrate data commands; options to return information about the status of query objects; copyright information; customer name; version; passwords; hotkeys; step type; direction; integration method; select table; option to insert from table; right/left table names; execution options before and after object execution; SQL; key fields; parent names; transformations; storemax; maxfield; additional where (may include anything desired to be added to an end of a Where Clause of an SQL statement after an insert or update is created); exclusive key (determines whether SQL in an insert needs to have a Where Clause to insure uniqueness); exclusive uses select table (exclusive key uses data from a select table to insure uniqueness); exclusive table (used by exclusive key to insure uniqueness); DLL or EXE file; Import Export (Import or Export when dealing with ODBC and text files); text file; field delimiter; record delimiter; checked status (used by a wizard to verify whether or not the associated step has yet been analyzed); and/or sub-objects.

There may be different types of objects. One or more of these objects may be a Database Object 840 for supporting an entire hierarchical tree 900. Another object type may include a version object configured to hold information such as but not limited to version, customer, and password information. Another object type may include an Integration Object 842 configured to perform conversion steps.

Integration Objects 842 may be configured to perform one or more conversion steps. The Integration Object(s) 742 may be configured to be managed by a module, such as but not limited to a Data Duplicator module 800. The Integration Objects 842 may be stored and streamed in binary, thereby providing enhanced speed and efficiency. Integration Objects 842 may own and/or be subordinate to other Integration Objects 842. Integration Objects 842 may be organized into a hierarchical tree structure 900, thereby permitting an ordered process. Integration Objects 842 may be configured to have properties subject to manipulation.

Properties 920 of Integration Objects 842 may be configured to allow manipulation of such properties 920 during use. For example, properties. 920 of Integration Objects 842 may be configured to be manipulated by other Integration Objects 842, or other instruction sets, during use. In another example, properties 920 of Integration Objects 842 may be configured to allow manipulation by a user in real time. In still another example, properties 920 of Integration Objects 842 may be populated by wizards, thereby eliminating typographical errors. In still another additional example, the direction an Integration Object 842 is to operate may be graphically configurable by right clicking an arrow 922 adjacent to a graphical representation of the object. The arrow 922 may be selected to point right or left to determine and indicate direction of operation. There may be a further selection to determine and indicate non-operation of the integration object.

Integration Objects 842 may be configured to allow free form SQL for selects. Integration Objects 842 may be configured to Insert, Update, and delete SQL built automatically based on Fields, and settings of the object(s). Also, Integration Objects 842 may be configured to Join tables to build the result fields needed for a step. More, Integration Objects 842 may be configured to use Decode and Case statements to transform fields. Still more, Integration Objects 842 may be configured to Insert into tables while selecting keys from another table. There may be other integration object properties 920 including but not limited to: name; data type; conversion object collection; right/left connection DSN, usernames, passwords, and database types; optional events to be called when a record is processed; integrate data commands; options to return information about the status of query objects; copyright information; customer name; version; passwords; hotkeys; step type; direction; integration method; select table; option to insert from table; right/left table names; execution options before and after object execution; SQL; key fields; parent names; transformations; storemax; maxfield; additional where (may include anything desired to be added to an end of a Where Clause after an insert or update is created); exclusive key (determines whether SQL in an insert needs to have a where clause to insure uniqueness); exclusive uses select table (exclusive key uses data from a select table to insure uniqueness); exclusive table (used by exclusive key to insure uniqueness); DLL or EXE file; Import Export (Import or Export when dealing with ODBC and text files); text file; field delimiter; record delimiter; checked status (used by a wizard to verify whether or not the associated step has yet been analyzed); and/or sub-objects.

Integration Objects 842 may be configured to end in various ways. One way for an Integration Object 842 to be configured to end may be when the Integration Object 842 has successfully completed itself. Another way may include ending upon error. A still another way may include ending upon error of a subordinate/Child 91. A yet still another way may be to continue upon error and end upon completion of processing source data despite any errors. A still further another way may be to continue upon error of a Child 912 object and end upon completion despite any errors of a Child 912.

Preferably Integration Objects 842 are configured to utilize the computing power of servers 110 and the manipulation power of databases 120 by ordering a Target 220 and/or Data source 210 database 120 to perform manipulations on data in furtherance of a conversions process as much as possible. In this way the conversion may be completed in less time and may be simpler.

Also, the work may be spread over several processors 310 and/or databases 120. For example, a substantial number of computers of an enterprise may be configured to accept orders for processing conversion steps. In this way massive amounts of data may be converted in substantially less time. This may be particularly important wherein a minimum of interruption is required. Where a tremendous conversion would otherwise take two weeks, it may only require one day if parallel processed, thereby allowing a tremendous conversion to be accomplished over a weekend.

Preferably Integration Objects 842 are written in a language such as Delphi that supports a true object model (inheritance, polymorphism, encapsulation, etc.) and that has an object writer and reader that write objects in binary instead of using text to store properties. Thereby objects, and preferably all their children, may be read and written as a block. This may be especially useful and greatly promote efficiency wherein Integration Objects 842 may be numerous and organized into a large hierarchy.

Preferably properties of the Integration Objects 842 may be configured according to the following:

Direction: Direction determines whether or not an object is used. The data selected will be inserted, updated, or deleted, into either a text file or the other database depending on the type. Preferably, source and destination are not both text files.

IdNotUsed: The Object will not be used, nor will it's Children 912 be used.

IdLeftToRight: The Object will be used with "Left" SQL Statements, wherein "Left" refers to a source displayed on the left portion of the screen, that may be the Source and "Right" refers to a source displayed on the right portion of the screen, that may be the Target.

IdToRightToLeft: The Object will retrieve data from the Right Data Source and output data to the Left.

Before Execute: This SQL Statement will be "Run" Before the Object's IntegrateData method is called. If StoreMax is True, and the SQL returns a value, that Value will be preserved in an internal variable Called FMAX.

After Execute: This SQL Statement will be executed after the Object's IntegrateData method is called. If StoreMax is True and the internal variable FMAX is not null, and the SQL has 'MAXFIELD' in it, the text MAXFIELD will be replaced with the value stored in the internal variable FMAX. The use of Before and After Execute in this manner allows updating a table of current Maximums. This is important for handling some database schemas, such as those that do not utilize an auto incrementing field for their key.

Insert, Update, Delete: The standard functions of integration should include Inserts, Updates, and Deletes. The Integration Objects may automatically build these statements based on the fields and on other properties.

Insert: Insert is "Run" when (Direction=idRightToLeft and SQL is not null and RightTableName is not null) OR (Direction=idLeftToRight and SQL is not null and LeftTableName is not null). The standard insert Statement will look like: 'Insert Into'+RightTableName+'('+Fields.Left.CommaText+') Values ('Values')'+Where Clause+AdditionalWhere; The Insert statement for selecting inserts will look like: 'Insert Into'+RightTableName+'('+Fields.Left.CommaText+') Select'+Values+'From'+SelectTable+Where Clause and will be called if the InsertFromTable Property is true.

Right table name is the property "RightTableName". Fields.Right.CommaText is likewise a property. Values are the Fields. Left.CommaText in this instance. The Where Clause may be generated automatically from the Fey fields, and parent table property.

Update: Update is "Run" when (Direction=idRightToLeft and SQL is not null and RightTableName is not null) OR (Direction=idLeftToRight and SQL is not null and LeftTableName is not null). The standard Update statement will look like this: 'Update'+RightTableName+'Set'+Values+Where–Clause+AdditionalWhere; Values will be a comma-separated list of "FildName=Value" generated from the Select. Where-Clause will be a string with the values "KeyFieldName=Value (And)" generated by selecting from the values from the select based on the key fields.

Delete: Delete is "Run" when (Direction=idRightToLeft and SQL is not null and RightTableName is not null) OR (Direction=idLeftToRight and SQL is not null and LeftTableName is not null). The Standard Delete Statement will look like this: 'Delete From'+RightTableName+'Where'+ Where–Clause+AdditionalWhere; Delete may be not preferred as it will destroy historical data. Instead, if possible, the record should be marked inactive.

Fields: The Fields property is a TCompare object and can hold two lists of field names. These names can be different names, but should correspond to the same data. It is noted that selecting data as the same name as the "target" tables field makes debugging easier. Also, there may be functions like selecting values from another table where names are used across the two databases. Usually the two sides of a TCompare object have the same number of entries, but there may be more in the select (or from side) to use for selection fields since the number of fields processed is determined by the destination (Or To Side)'s count.

Parent Fields: Parent Fields exist to allow selection of data from one Table to insert into another (Like Selecting ID from person to create the Login table).

Key Fields: Key Fields may be used for at least two purposes: First, when Updating or Deleting a Table, the key fields determine what fields are in the where clause in a KeyFieldName=Value(,)) Format. Second, when Inserting, if the key fields are empty " " or are 'NULL' they will be populated with numbers from the GetNextID(TableNumber: Integer) function. In databases with auto-incrementing-numbers schemes, these fields can be generated automatically by selection and/or insertion. In other databases, this may require math on a max selected in the before SQL which will be updated by the After SQL.

Transformation Tables: If a field transform can be done with a "Decode" or a "Case" statement in SQL, it is preferred to do so. Since this cannot always be accomplished, there is the transform fields list, which is a tCompare Object, Left, and right. Transformation tables are lists of ThisField.ThisValue=ThatField.ThatValue. The lists will be processed and values checked if a current filed Value combination matches a stored value for the from field list it will be replaced with the value from the to list.

When selecting from a different table, it may be necessary to place the field's name in the "TransformTables as a value. To do this enter Fieldname*Value into both tables in the same numerical location the * will force that text into the output field regardless of the value carried in that field from the select. (example: The Value ID.*.p.ID in the same place in both transform lists will result in the ID field of the insert Query=p.ID. Using this functionality permits having selects going from several tables at once. It is preferred, for purposes of enhancing speed, to perform as many transformations as possible using decode, or case statements in the select SQL. It is preferred that both sides of the Transformations property should have the same number of Entries.

Inserting From a Select. Inserting from a select statement uses the Transforming tables function described above. There are other settings that may need to be set to make this work properly. Insert From a Table should be set to True, Select Table Should be set to: TableName [identifier][,TableName [Identifier]] . . . .

Exclusive Tables. Exclusive Tables are often used with Inserting from a select, but not always exclusively. To use an exclusive table, you set the Exclusive Key Property to true, the Exclusive Table should contain the name of a table to be checking for Exclusivity against. Exclusivity will be determined by selecting the Key Fields names from the table that are equal to the values currently selected from the Source Database. (I.E. Select ID from Person Where ID='42' where exclusive table is person, and key fields contains only ID) This will return a record set of 0 rows where the record needs to be inserted, and a record set of greater than 0 rows where the record already exists.

Selecting from a Parent. Selecting from a parent may help in populating relationships like Login relates to Person. ParentNames may be used to retrieve the Parent info. The SelectTable may be set to point to the Parent table.

Where Clauses: Inserts: WhereClauses are generated for the select from values selected from the source table into a string in a "(And) ParentFileName=Value" format.

Updates and Deletes: WhereClauses for Updates and Deletes are generated from values selected from the source table into a string in "(And) KeyFieldName=Value" format.

The following represents an exemplary typical transformation that may be performed by an integration object. There may be a source field that may have the following possible entries: 0—inactive, 1—active, 2—hold, 3—preset, 4—definitional. There may be a target field having the following possible entries: 0—active, 1—inactive, 2—other. The source field in each source record may need to be transformed to the format of the target field for each target record. Therefore the integration object may be called to read the source field and apply transformation rules of mapping 0 to 1, 1 to 0, and 2, 3, and 4 to 2. One skilled in the art would appreciate that as described, integration objects are not limited to this type of transformation, but may perform a large variety of transformations.

The Data Duplicator module 800 may be launched in a stand-alone non-development executable, thereby permitting continued use of a specified scheme without allowing further modification or creation. The Data Duplicator module 800 may be launched from an executable, DLL or via an OCX control or may be loaded as a service, as in Windows 2000, XP, and/or 2003.

The Data Duplicator module 800 may have a tabbed main screen; the tabs 930 may then be subdivided into screen areas. The user may switch between tabs 930 at any time. This ability to switch between tabs 930 advantageously permits alternative views of results of actions and/or decisions made while using the Data Duplicator module 800. The tabs/screen structure may be as follows:

Schedule Tab 932

Automated integration events may be scheduled. There may be an identification label, a determined launch time (time of day, day, days, date, dates, etc.), an object to launch, and/or a script to run. Multiple automated integration events may be managed by adding and/or deleting events from a scheduler. Further, properties of automated integration events may be modified. It may be that an event may be disabled without deleting by assigning NULL to the launch time.

Log Tab 934

A log screen may display a start time, stop time, and/or messages generated by the objects if the objects encounter any errors with a process or script. It is preferred that there be a first line comprising many asterisks, thereby setting apart an entire section of log information. There may also be identifying information on the first line, such as a time and date an error occurred and text of an error message. Preferably, there will be a third line starting a paragraph, wherein the paragraph may indicate whether a LeftTempQuery is active and what a LeftTempQuery includes. Also, there may be a next paragraph indicating whether a RightTempQuery is active and what a RightTempQuery includes. There may be further paragraphs indicating similar or identical information regarding LeftQuery, LeftQuery SQL, RightQuery, and/or RightQuery SQL. The log screen may be populated by testing a process or script. For example, a user may select a "test" button configured to step through a process or script. Upon selection of the test button, the log screen may automatically activate and populate with any errors encountered during a test of the process or script.

In operation, a user viewing a log file displayed when the Log tab 934 is active may be assisted in discovering/determining/solving problems. For example, a user may spot an SQL error by viewing displayed SQL. A user unable to determine if the SQL is a source of error may choose to copy the SQL into an SQL worksheet to see if the SQL will run without error. In another example, a user may isolate portions of SQL that may not be functioning correctly and may use them individually in an SQL worksheet to determine if there are any inconsistencies. For example, where an error regards an SQL insert statement, a user may isolate the associated select to determine if values being selected are of the correct type (including size) to be inserted.

Integration Objects Tab 936

This tab may include a tree view 900 of a process. The tree view 900 of the process may include selectable objects and may graphically show relationships between objects. Further, one or more properties 920 of each object may be graphically shown in the tree view 900.

It may be that objects may be added, deleted, altered in this view. There may be a list of object properties 920 for a selected object. Properties 920 of an object may be alterable in this view. There may be one or more options to save a process, test a process, and/or refresh a process. The tree view 900 may be graphically alterable, such as with drag and drop functionality. Properties 920 of objects may be graphically alterable in the tree view 900, such as with toggling options, such as toggling process direction 922.

SOL Scripts Tab 938.

In this tab there may be included SQL that may be used to select data from a source database if the source database is an ODBC database. There may be triggers in the SQL Scripts tab 938. Triggers may be used to track when a record is inserted, updated, or deleted.

In operation of a Data Duplicator module 800, a user may configure objects and other entities controllable and/or callable by the Data Duplicator module 800. Preferably, configuration will be directed to conversion of at least one set of data from a Data source 210 to a Target 220. The user may test configurations, view partial or complete results of use of at least a portion of a configuration, develop objects, attach objects, organize objects, relate objects, alter object properties, record results, evaluate configurations, and perform data conversion. Information relating to data conversion may be preferably stored in text files and/or an industry standard file such as CSV.

Preferably, when configuring the Data Duplicator module 800 for data conversion, a configuring user will conform the structure of the tree view of the graphically configurable hierarchy of object to the structure of the target database 220. Therefore business rules of the target database may be visually present in the object structure. Advantageously, it is clear where data is going (instead of only knowing where it may be coming from). Further, in this way functionality is documented visually in the hierarchy and is updated simultaneous with creation. Therefore documentation of functionality is integral to the process and cannot be separated therefrom.

When converting, the Data Duplicator module 800 may be configured to read each file only once, stepping through each of the objects, preferably disposed in a hierarchy 900. Thereby conversion speed and efficiency may be enhanced. Further, the Data Duplicator module 800 may be configured to convert data in preparation for population of multiple Targets 220 in a single pass of the program through the file.

Also, the Data Duplicator module 800 may be configured to share processes with multiple machines. For example, a Data Duplicator module 800 may be configured to instruct multiple machines to simultaneously perform conversion steps. Preferably a Data Duplicator module would assign portions of work for each machine, such as assigning a non-overlapping record range to each machine. A Data Duplicator module 800 may manage each machine and utilize results obtained from each machine, thereby greatly enhancing conversion speeds. Also, a Data Duplicator module 800 may be configured to run in various modes, including but not limited to batch, real-time, and/or near-real-time.

Figure 11:
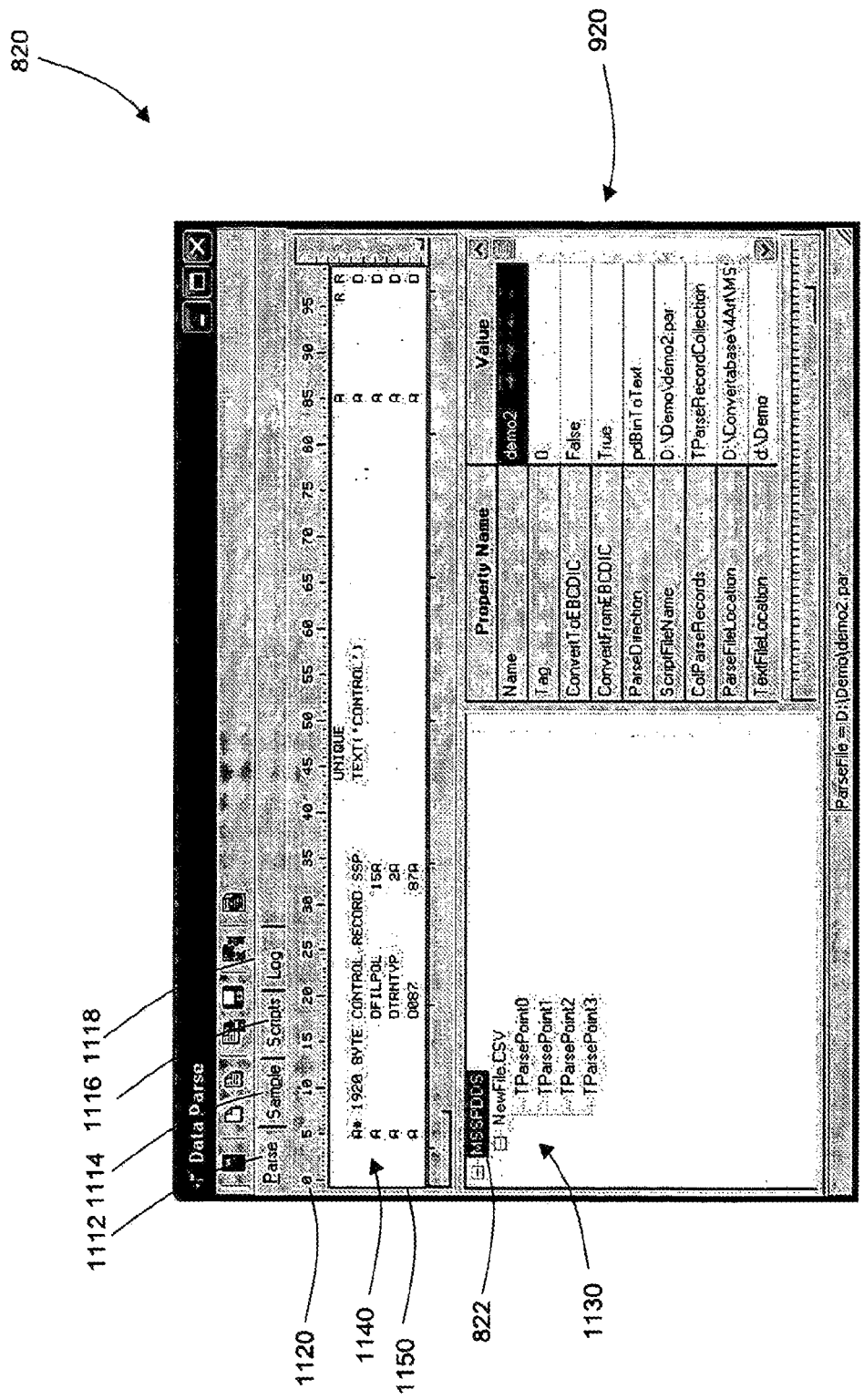
FIGS. 11-13 show an exemplary screenshot of a Data Parse module according to one embodiment of the invention.
Figure 12:
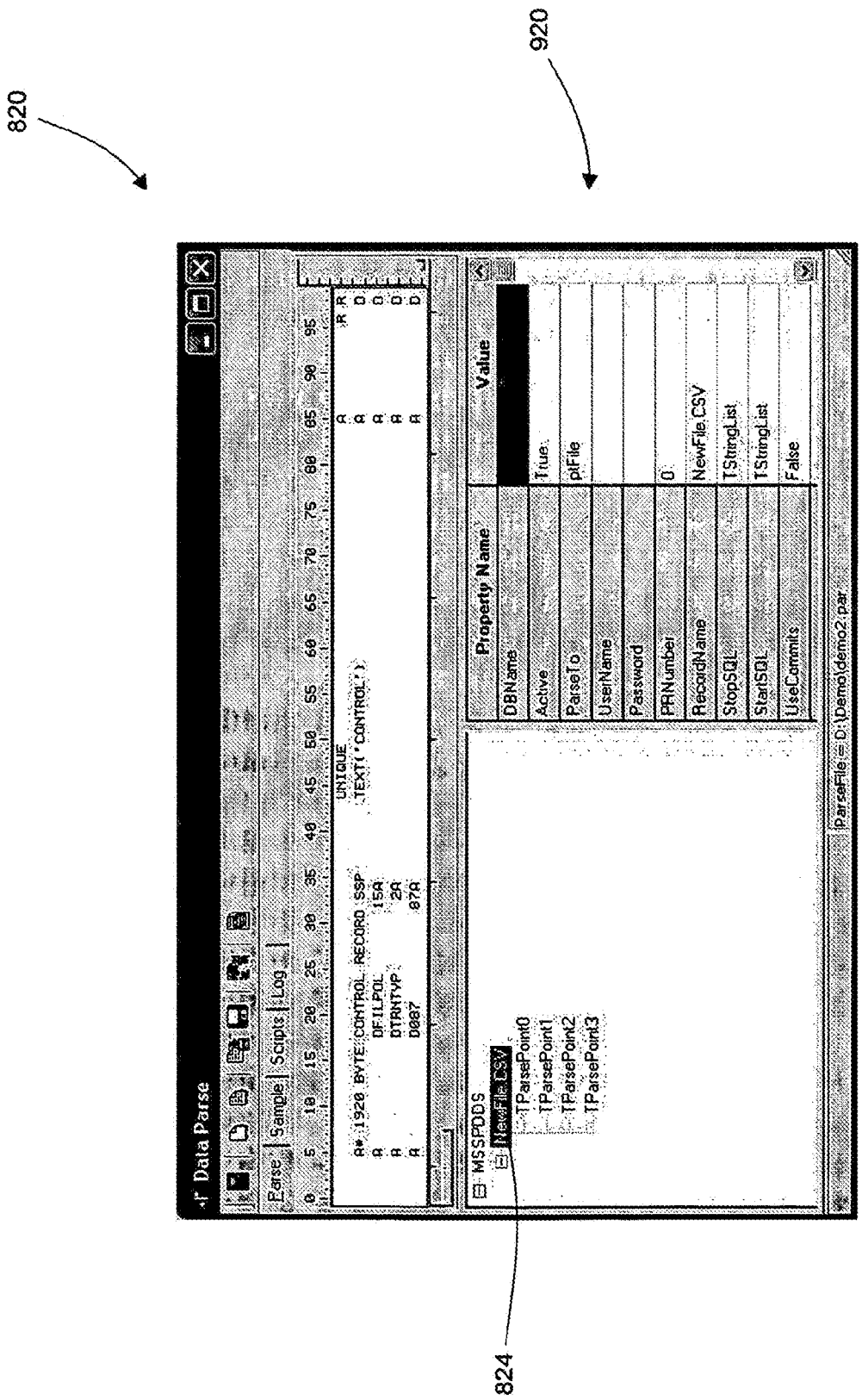
Figure 13:
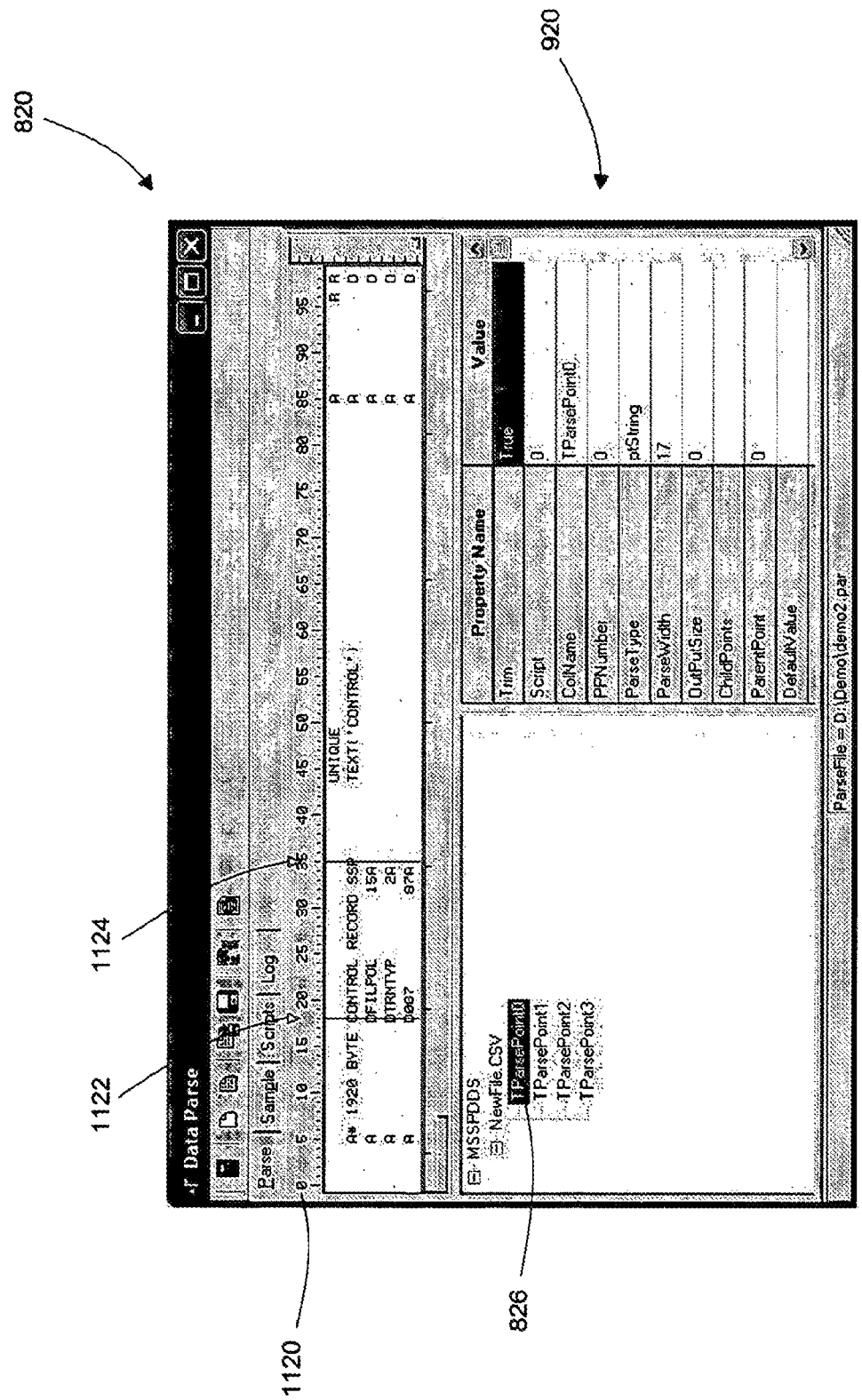

FIGS. 11-13 shows an exemplary screenshot of a Data Parse module 820 according to one embodiment of the invention. FIG. 11 illustrates a Parse File Object 822 selected; FIG. 12 illustrates a Parse Record Object 824 selected; FIG. 13 illustrates a Parse Point Object 826 selected.

Data Parse 820 may be used to parse flat files such as CSV, Cobol, RPG II, RPG III, Fixed Length, and Character Delimited files. The Data Parse module 820 may be coded in machine code/binary so it is not interpreted. Advantageously, this permits rapid loading of the module and processing of the instructions thereof.

Further, since the Data Parse module 820 may be independent of other modules, an operator may be preparing/using Data Parse 820 while another operator simultaneously performs other functions with other modules. Still further, the Data Parse module 820 uses user defined parse point objects that may be configured using the graphical user interface. Also, there may be a visually configurable record size, permitting a user to adjust a record size and see record and field patterns displayed visually, thereby permitting a user to quickly determine the appropriate record size and get an understanding of the structure. The Data Parse module 820 may use a C-style pointer and avoid using any API calls, thereby permitting a theoretical maximum record size of approximately 4 Terabytes. Also, the Data Parse module 820 may be configured to ignore the function of any and all control characters, such as carriage returns, that may interfere with proper parsing of the flat file. Control characters may still be shown visually. Further, there may be supported single pass parsing of a single file into multiple target files. Still further, Data Parse 820 may be configured such that relationships between such files can be maintained.

Additionally, a Data Parse module 820 may be configured to create key fields at run-time. For example, in database containing employees that have children, there may be a different number of children for each employee, thereby requiring the generation of unique key fields to assign to the employee for association of an unknown number of children. In one embodiment this may be accomplished by assigning a key field number to the record according to a record number. For example, wherein the record needing a unique key is the 476.sup.th record to be processed by the Data Parse module 820, a unique key of 476 may be assigned during run-time. Further, multi-field and/or complex keys may also be assigned.

The Data Parse module 820 may have a tabbed main screen; the tabs 930 may then be subdivided into screen areas. The user may switch between tabs at any time. This advantageously permits alternative views of results of actions and/or decisions made while using the Data Parse module 820. The tabs/Screen structure may be as follows:

Parse Tab 1112:

Top ½ of the screen (Adjustable) may be a control that has a ruler 1120 across its top, an area that will display data from a file on disk, and can show stop 1122 and start points 1124 for a Selection. This portion of the screen may be scrollable in that any portion of the file to be parsed may be displayed thereon. The Lower Right ¼ (Adjustable) of the screen may have a Tree view structure 1130 on it. The Levels of the tree view may tell what kind of object it contains. The first level may be the Source file and holds the object that has the source file definition in it. The second level may hold output file definitions. The third level may hold individual parse point information. The Lower Left ¼ may have the properties 920 of the selected item in the tree view displayed.

Sample Tab 1114:

This screen may be used to display the parsed information for the records currently displayed in the control at the top of the Parse screen.

Scripts Tab 1116:

The top control may be a drop down list or Scripts already added to the Script. This control may be preceded and followed by buttons that allow the user to add, Remove, Test and/or look at Scripts on the hard disk. The middle area may be filled with the source code for a Script. The bottom area may contain output from the script.

Log Tab 1118:

Log may contain the information about the test run, including any errors that were encountered.

In operation, a user may load a file, such as a flat file, into a Data Parse module 820. A portion of the file may be displayed visually in a window, preferably in several consecutive rows 1140 of any number of characters, and preferably more than about one hundred characters. A record size, determining after how many characters to start a new line or record, may be adjusted to a known record size or may be adjusted incrementally. Where a record size is unknown, the user may incrementally adjust the record size and watch the record display window 1150 for patterns to develop. As patterns develop the user may be able to quickly and conveniently discover the record size and may also discover other details regarding the scheme of data storage.

Having properly configured a record size for the flat file, the user may then evaluate the file and adjust the viewable configuration to account for common features of flat files such as record data padding. For example, the user may define an offset to crop padded data by setting a character number as the first displayable character number, thereby cropping any number of irrelevant characters.

Once satisfied with the: configuration of the view window 1150, the user may create parse point objects 826 by graphically selecting character sets in a record and defining them as boundaries 1122 and 1124 of parse point objects 826. A parse point object 826 may specify a piece of a file to be extracted, processed, filtered, etc. Parse points 826 may be organized/held by a parse record 824 that may call the parse points 826, preferably in the order they have been organized, preferably in output order, not in read order. Parse records 824 may write out to files and/or to databases.

Parse records 824 may be held by a Parse File Object, or Parse Source Object 822, which may be the root object for a parsing process. For example, when a Parse File Object 822 may be called to parse a file, it may start with the file, read in the first record, and pass the first record to the first parse Record Object 824, which may call the first parse point. The parse Record Object 824 may continue calling parse points, or Parse Point Objects 826 until all have been called. When control may return to the Parse File Object 822, the Parse File Object 822 may call the next parse Record Object 824 to act on the same line until all parse records have been called. Then the Parse File Object 822 may read the next line and start calling parse records, or parse Record Objects 824 again. Thereby the lines may be parsed to any number of records. Therefore a single line may be parsed into several different records. A database may be structured thereby from a flat file.

The Parse Point Objects 826 may include properties that may be set by the user, such as the following properties: name, active status, username, password, parse record number, write instructions, record name, use commits, FADOQuery, FADOConnection, instructions such as SQL instructions to run before or after running against a database, event to have called on Error, event to call if assigned to report status of the parse process, start position, parse width, trim, output field, auto increment field, new line if not null, parse, type (string, currency, integer), parent point, default values, and associated script(s). Preferably the parse point objects are named with relation to the type of data to be parsed therefrom. For example, a Parse Point Object 826 defined by starting character 47 and ending character 103 that contains customer account numbers may be named "CustAcctNo." The user may define any number of Parse Point Objects 826, permitting parsing of any portion of the flat file, up to and including the entire contents thereof. The Parse Point Objects 826 may then be used to extract the contents of the flat file into another file, such as a standardized database file, or such as a Comma Separated Values (CSV) file.

Figure 14:
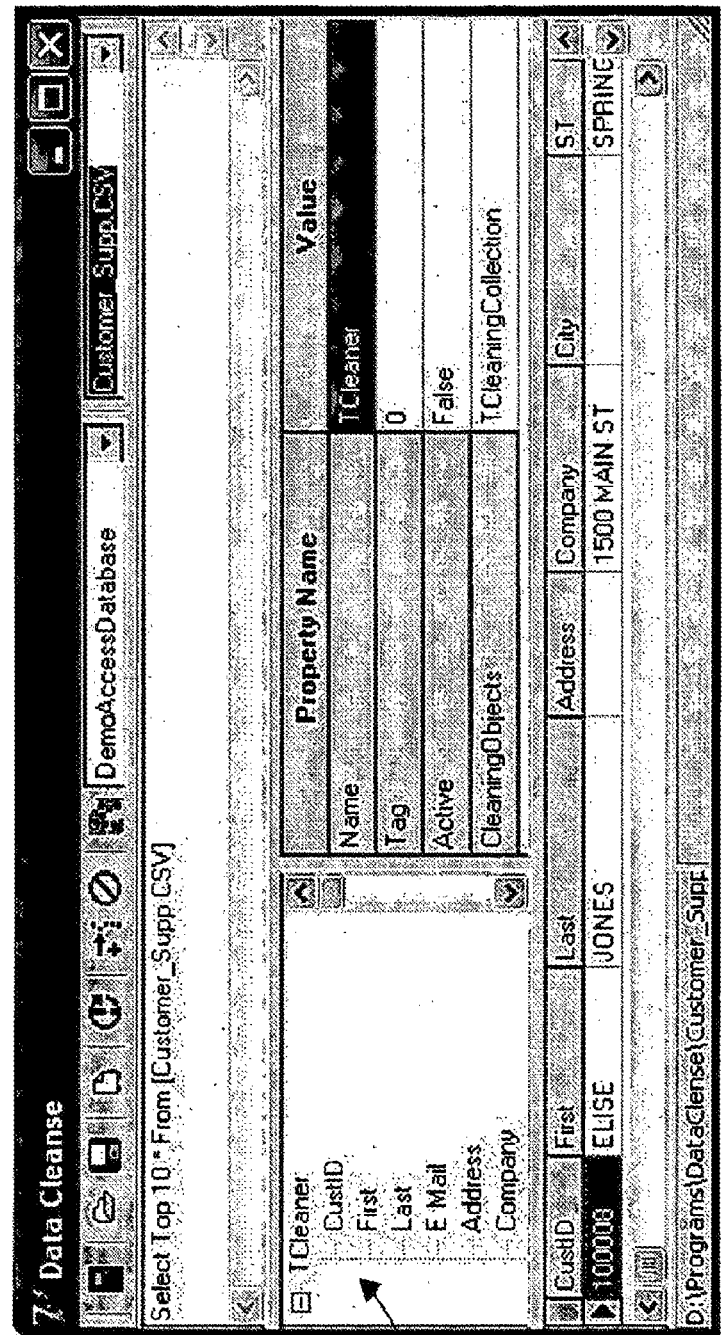
FIG. 14 shows an exemplary screenshot of a Data Cleanse module according to one embodiment of the invention.

FIG. 14 shows an exemplary screenshot of a Data Cleanse module 830 according to one embodiment of the invention. Data Cleanse 830 may be used to clean/condition data for convenient use by a Target 220 (see FIG. 2). The Data Cleanse module 830 may be programmed in machine code/binary, thereby not being interpreted and thus making the module run quickly and efficiently. Further, there may be included standardized formatting routines. There may also be field masking and/or date conversion. There may be included support for complex scripts, such as those with Python. The data may be organized by field type and the field types may then also define cleansing objects 832 that may be named in relation to the fields. For example, a field named CustID may be associated with a cleanse object 832 named CustID. The cleanse objects 832 may include properties 920 such as active status, field number, field name, field type, field size, in mask, out mask, default value, script. For example, wherein the active status of a particular cleanse object 832 may be set to "False," the Data Cleanse module 830 may not perform any transformations through the particular cleanse object 832 on any data contained in the field named in the Field Name property.

In operation, a file, preferably a hierarchical database file of a standardized format such as CSV, may be read into the Data Cleanse module 830. A Data Cleanse module 830 may be called by another module, such as but not limited to a Data Duplicator module 800. A Data Cleanse module 830 may be called multiple times during varying steps of a data conversion process. A Data Cleanse module 830 may determine fields having names and other properties of the fields and may create data cleanse objects 832 associated with the determined fields. A user may then adjust properties 920 of the data cleanse objects 832. Such adjustment may be directed to modify data contained in fields for better compliance with a target 220. For example, date data may be conditioned to be in the same format as the date data in the target 220 (i.e. changing dates in a format of DD/MM/YY to MM/DD/YYYY) Data maybe forced to comply with format requirements of a target database, such as but not limited to integers, real numbers, strings, string requirements, currency, date, time, date and time, and/or custom formats. Padding may be added or truncated based on specified parameters. Duplicate fields may be eliminated. Data may be checked for validity. Therefore, data may be more correctly integrated into a target 220. @.

Figure 15:
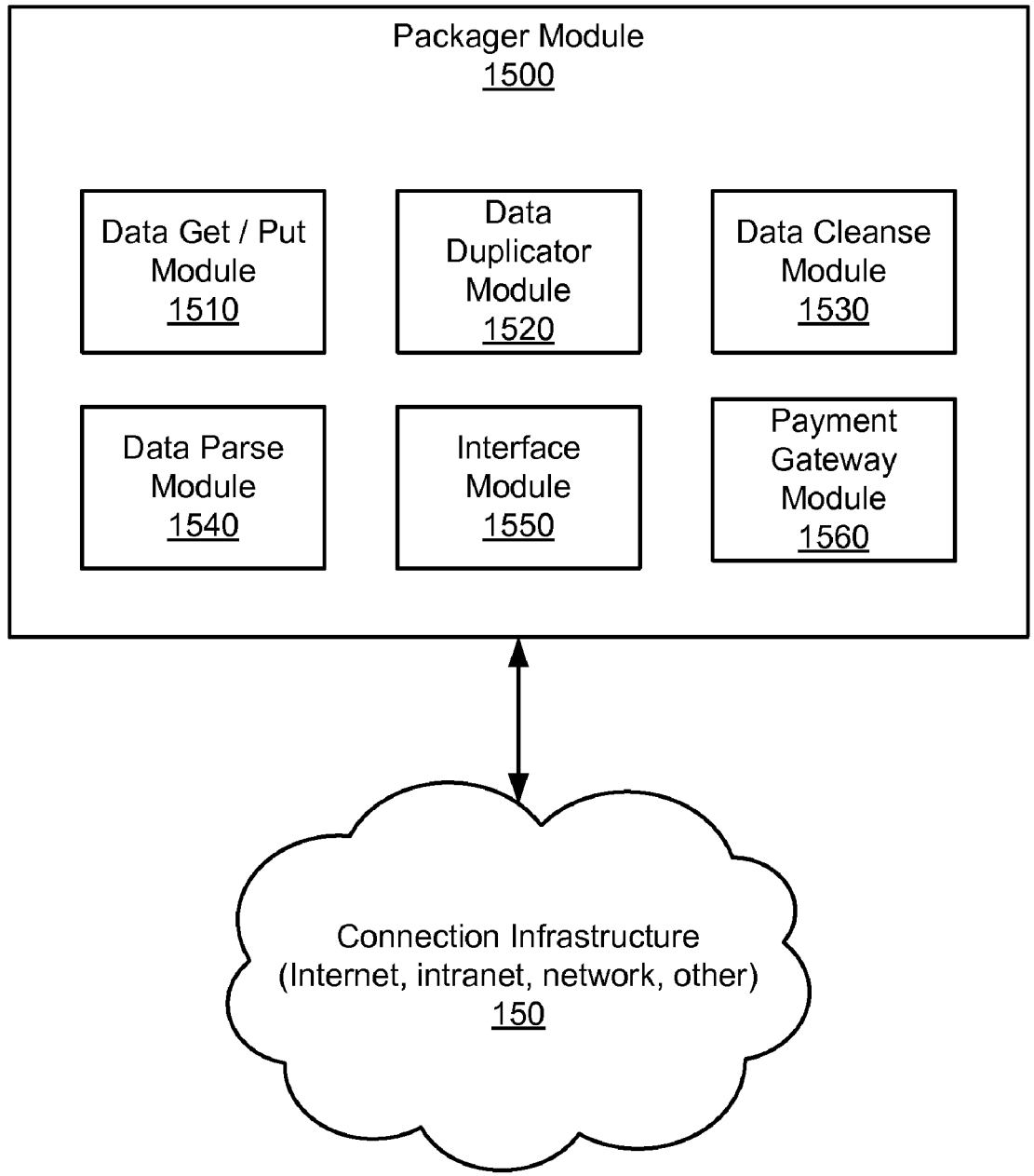
FIG. 15 is a schematic block diagram illustrating one embodiment of a packager module.

FIG. 15 illustrates one embodiment of a packager module 1500. The packager module 1500 may include a data get/put module 1510, a data duplicator module 1520, a data cleanse module 1530, a data parse module 1540, an interface module 1550, and a payment gateway module 1560. The packager module 1500 provides a unified framework and interface for a decentralized data conversion tool.

In one embodiment, the elements of the packager module 1500 are formed into a single data file. In a further embodiment, the packager module 1500 and its components comprise computer software code in machine language. For example, the packager module 1500 may be a single, binary, executable file containing a data get/put module 1510, a data duplicator module 1520, a data cleanse module 1530, a data parse module 1540, an interface module 1550, and a payment gateway module 1560.

The data get/put module 1510, in one embodiment, is configured to download/upload data over a connection infrastructure 150 (see FIG. 1), such as TCP/IP, or similar, connections. The Data Get/Put module 1510 may be configured to pull data over FTP, HTTPS, and/or HTTP connections, thereby permitting access to data that would otherwise not be available over the network. There may be included support for passwords and/or encryption. The data get/put module 1510 may retrieve data from a data source and write data to a target 220 (see FIG. 2).

In one embodiment, the data duplicator module 1520 is configured to perform transformations on source data from a data source. The data duplicator module 1520 may receive data downloaded by the data get/put module 1510. The data duplicator 1520 may further include integration objects configured to perform conversion steps, the conversion steps representing portions of the overall transformation performed on the source data. In one embodiment, the integration objects are contained in a hierarchical structure defining an order of execution for the integration objects. The order of execution may comprise a hierarchical structure indicating the sequence in which the integration objects act on the source data to perform the transformation of the source data.

The data cleanse module 1530, in one embodiment, may be used to clean/condition data for convenient use by a Target 220 (see FIG. 2). The Data Cleanse module 830 may include standardized formatting routines. There may also be field masking and/or date conversion. There may be included support for complex scripts, such as those with Python. The data may be organized by field type and the field types may then also define cleansing objects 832 that may be named in relation to the fields. For example, a field named CustID may be associated with a cleanse object 832 (see FIG. 8) named CustID. The cleanse objects 832 (see FIG. 8) may include properties such as active status, field number, field name, field type, field size, in mask, out mask, default value, and/or script.

In one embodiment, the data parse module 1540 parses flat files such as CSV, Cobol, RPG II, RPG III, fixed length, and character delimited files. In certain embodiments, the data parse module 1540 may include the features of the data parse module 820 described in relation to FIGS. 11-13.

The interface module 1550, in one embodiment, receives input from a user to control the packager module 1500. The interface module 1550 may further transmit a representation of the transformation to be performed by the data duplicator module 1520. In one embodiment, the interface module 1550 transmits and receives over a network, such as the Internet, an intranet, a local Ethernet connection, or the like. In one embodiment, the interface module 1550 provides a unified interface for the elements of the packager module 1500 such that a user can control the various modules of the data conversion system 200 from a single point with a consistent interface.

In one embodiment, the interface module 1550 comprises a web browser-readable interface. The interface module 1550 may be hosted by a server configured to make the web browser-readable interface available on a network. For example, the interface module 1550 may be accessed by a web host; the web host may make a hypertext transport protocol (HTTP) representation of the transformation to be performed by the data duplicator module 1520 available on the Internet.

The interface module 1550 may further include drag and drop capability for modifying the hierarchical structure of the integration objects used by the data duplicator module 1520. Drag and drop capability comprises giving a user the ability to grab an integration object and drag the object to a new place in the hierarchical structure. For example, the interface module 1550 may include a java applet configured to present a drag and drop interface for integration objects that allows a user to view the hierarchical structure over a web connection, click on an integration object with a mouse, and drag the integration object to a new position in the hierarchical structure.

In another embodiment, the interface module 1550 is configured to be customizable such that a brand of a third party is displayed by the interface module. For example, a reseller may enter into an agreement with a provider of the packager module to provide the use of the packager module to an end user. The reseller may use the branding customization to modify logos, graphics, and other brand information displayed by the interface module to display the brand of the third party rather than the brand of the provider.

The payment gateway module 1560, in one embodiment, receives a payment from a user to enable access to the data duplicator module 1520. The payment may be a one-time payment to enable a predetermined number of uses of the data duplicator module 1520. In another embodiment, the payment may be a term payment to enable use of the data duplicator 1520 for a period of time. In a further embodiment, the payment gateway module 1560 may be configured to cause a term payment to recur periodically, such that the term payment is made every term until discontinued.

The payment may be received by the payment gateway module 1560 through a secure transaction protocol over a network. For example, the payment gateway module 1560 may use an HTTPS connection to receive a credit card number to authorize payment.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 16:
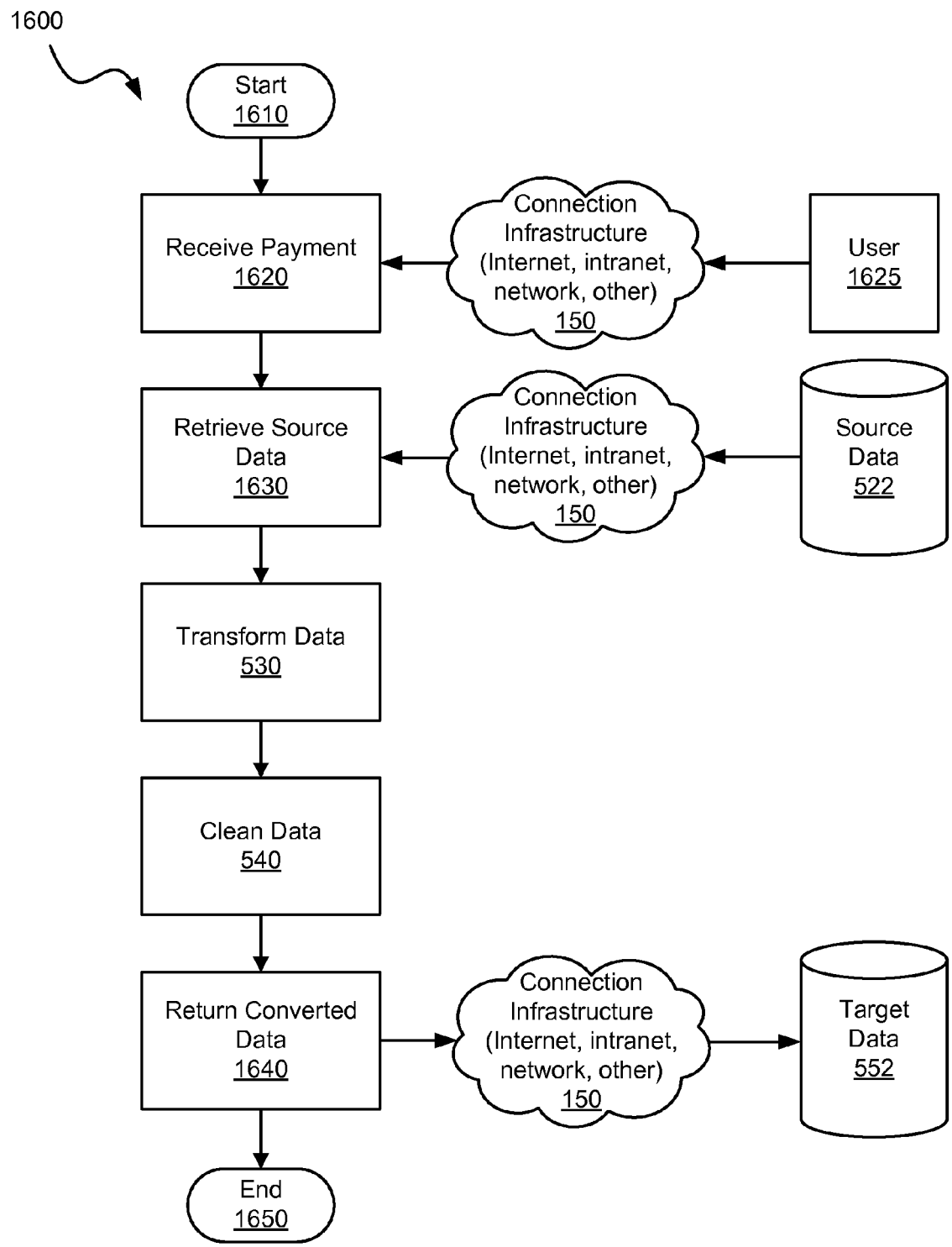
FIG. 16 is a schematic flow chart illustrating one embodiment of a decentralized data conversion method.

FIG. 16 is a schematic flow chart diagram showing the various steps of a method 1600 for decentralized data conversion. The method 1600 is in certain embodiments a method of use of the system, method, and apparatus of FIGS. 2-15, and will be discussed with reference to those figures. Nevertheless, the method may also be conducted independently thereof and is not intended to be limited specifically to the specific embodiments discussed above with respect to those figures.

As shown in FIG. 16, the method 1600 starts 1610 and the payment gateway module 1560 (of FIG. 15) receives 1620 a payment. The payment may be received 1620 from a connection infrastructure 150 (of FIG. 1) and be authorized by a user 1625. The receipt 1620 of payment may enable access to the data duplicator module 1520 (of FIG. 15) for the user 1625. In some embodiments, the payment may be a one-time payment or term payment.

Next, a data get/put module 1510 (of FIG. 15) retrieves 1630 source data 522 from a data source 210 (of FIGS. 2-3). The data source 210 may transmit source data 522 for retrieval 1630 over a connection infrastructure 150, such as the Internet, an intranet, an Ethernet connection, or the like. For example, a user 1625 may select a data source 210 consisting of a flat file on the user's local computer through a web browser, the web browser operated by the data conversion system 200 (see FIG. 2). The data get/put module 1510 may then retrieve 1630 the flat file on the user's local computer. In another example, a user 1625 may specify an address for a data source 210, such as a web address, an FTP address, or the like for retrieval 1630 by the get/put module 1510.

Next, a data duplicator module 1520 (of FIG. 15) transforms 530 the source data 522 to match the requirements of a target 220. Preferably, the transformation step is carried out in a similar manner to a like numbered step described in relation to FIG. 5.

Next, a data cleanse module 1530 cleans 540 the transformed data. Preferably, the cleaning step is carried out in a similar manner to a like numbered step described in relation to FIG. 5.

Next, the data get/put module 1510 returns 1640 converted data. In one embodiment, the converted data is returned 1640 over a connection infrastructure 150 such as the Internet, an intranet, an Ethernet connection, or the like. For example, the converted data may be returned 1640 as a file through a web browser over the Internet to be stored by the user 1625. In an alternate embodiment, the converted data may be returned 1640 by inserting the converted data directly into a target database. After returning 1640 the converted data, the method ends 1650.

Figure 17:
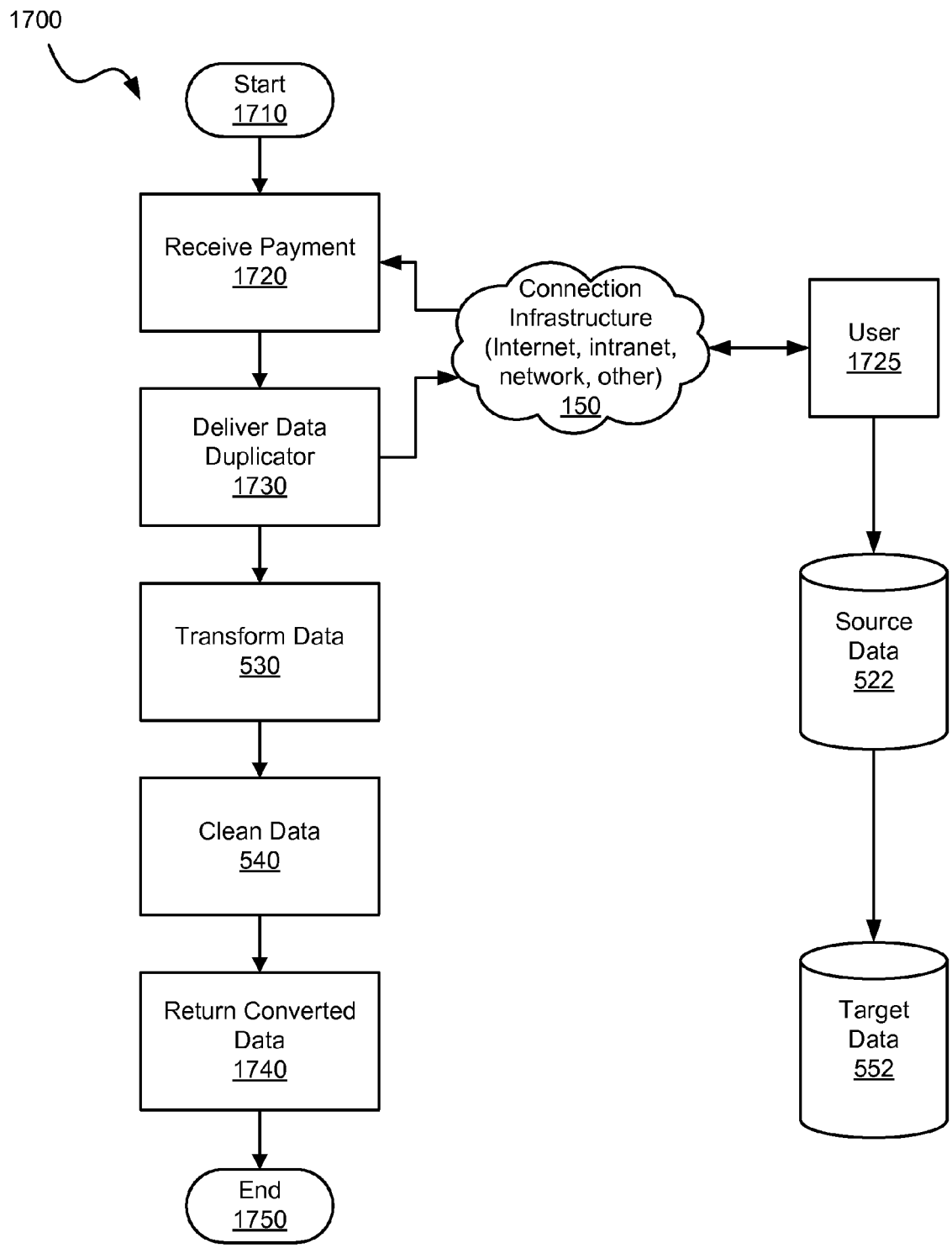
FIG. 17 is a schematic flow chart illustrating one alternate embodiment of a decentralized data conversion method.

FIG. 17 is a schematic flow chart diagram showing the various steps of a method 1700 for decentralized data conversion. The method 1700 is in certain embodiments a method of use of the system, method, and apparatus of FIGS. 2-16, and will be discussed with reference to those figures. Nevertheless, the method may also be conducted independently thereof and is not intended to be limited specifically to the specific embodiments discussed above with respect to those figures.

As shown in FIG. 17, the method 1700 starts 1710 and the payment gateway module 1560 (of FIG. 15) receives 1720 a payment. The payment may be received 1720 from a connection infrastructure 150 (of FIG. 1) and be authorized by a user 1725. The receipt 1720 of payment may enable access to the data duplicator module 1520 (of FIG. 15) for the user 1725. In some embodiments, the payment may be a one-time payment or term payment.

Next, an interface module 1550 (of FIG. 15) delivers 1730 the data duplicator module 1520 to the user. In one embodiment, the data duplicator module 1520 is delivered 1730 over a connection infrastructure 150. The delivery 1730 may take place over the same connection infrastructure 150 used to receive 1720 the payment.

In one embodiment, the data duplicator module 1520 delivered 1730 may be an ActiveX control. In another embodiment, the data duplicator module 1520 delivered 1730 may be a java applet. In another embodiment, the data duplicator module 1520 delivered 1730 may be an executable file. In a further embodiment, the data duplicator module 1520 delivered 1730 may be a script.

For example, a user may visit a web page of a service provider and make a payment to receive use of a data conversion product. The service provider may receive 1720 the payment and deliver 1730 an ActiveX control through the web browser to the user, the ActiveX control configured to perform data conversion.

Next, the delivered data duplicator module 1520 transforms 530 the source data 522 to match the requirements of a target 220. Preferably, the transformation step is carried out in a similar manner to a like numbered step described in relation to FIG. 5. In one embodiment, the transformation 530 is carried out on a computer operated by the user 1725.

Next, a data cleanse module 1530 cleans 540 the transformed data. Preferably, the cleaning step is carried out in a similar manner to a like numbered step described in relation to FIG. 5. In one embodiment, the transformation 530 is carried out on a computer operated by the user 1725.

Next, the data get/put module 1510 returns 1640 converted data. In one embodiment, the converted data is returned 1640 to a file on a computer operated by the user 1725. In an alternate embodiment, the converted data may be returned 1640 by inserting the converted data directly into a target database accessible by the user 1725. After returning 1640 the converted data, the method ends 1750.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to for decentralized data conversion, the apparatus comprising:
    a storage device storing executable code;
    a processor executing the executable code, the executable code comprising
    a data get/put module
        extracting source data from a data source to form extracted data;
    a data duplicator module transforming the extracted data to form convened data adapted to a target, the data duplicator module comprising one or more integration objects each written in a language that supports inheritance, polymorphism, and encapsulation and compiled into a binary file selected from a Dynamic-Link Library (DLL) file, an ActiveX control, an executable file, and a java applet, each binary file integration object performing at least one conversion steps, each binary file integration object comprising a plurality of properties that are modified in the binary file integration object during use through a graphical user interface, the graphical user interface further organizing the binary file integration objects in a hierarchical structure defining an order of execution modified through drag and drop commands, the data duplicator streaming and executing each binary file integration object with the modified properties and each child integration object of each binary file integration object specified in the hierarchical structure as a block.

2. The apparatus of claim 1, the get/put module further:
receiving a data source over a network;
returning converted data over the network;
the executable code further comprising an interface module, the interface module
transmitting a representation of the one or more binary file integration objects over the network for display in the hierarchical structure;
receiving a modification of the hierarchical structure of the one or more integration objects;
wherein the network is the Internet.

3. The apparatus of claim 2, the executable code further comprising a web browser-readable interface.

4. The apparatus of claim 3 the executable code further comprising a payment gateway module receiving a payment from a user and in response to the payment delivering the data duplicator module over a network to a computer, the computer carrying out the data duplicator module transformation, and wherein the data duplicator module is compiled and executed as an ActiveX control.

5. The apparatus of claim 4 wherein access to the data duplicator module is enabled in response to receiving a payment from a user.

6. The apparatus of claim 2 wherein the interface module is customizable such that a brand of a third party is displayed by the interface module.

7. The apparatus of claim 1 wherein the data duplicator is written in machine language.

8. The apparatus of claim 1 the executable code further comprising a documentation generation module generating documentation of a configuration of the decentralized data conversion apparatus by reading the integration objects and writing a data mapping document.

9. The apparatus of claim 1 the executable code further comprising a packager module providing a unified interface for the modules of the apparatus.

10. The apparatus of claim 1 wherein the modules of the apparatus are contained in a single file.

11. The apparatus of claim 1 the executable code further comprising a data cleanse module modifying data in the source data for better compliance with the target.

12. The apparatus of claim 1, the binary file integration objects performing SQL commands, the plurality of properties comprising a name, a data type, a version, a conversion object collection, right/left connection DSN, a username, a password, a database type, an event to be called when a record is processed; an integrate data command, an option to return information about the status of a query object, copyright information, a customer name, a version, a hotkey, a step type, a direction, an integration method, a select table, an option to insert from a table, a right/left table name, an execution option before integration object execution, an execution option after integration object execution SQL, a key field, a parent name, a transformation, an addition to a where clause, an exclusive key determining whether an SQL insert needs to have a Where Clause to insure uniqueness, an exclusive uses select table that uses data from a select table to insure uniqueness, an exclusive table used by the exclusive key to insure uniqueness, a DLL file, ODBC Import Export, a text file, a field delimiter, a record delimiter; a checked status verifying whether an associated step has been analyzed, a sub-integration object.

13. A storage device storing executable code executed by a processor for decentralized data conversion, the operations of the computer useable program code comprising:
extracting source data from a data source to form extracted data; and
delivering a data duplicator, the data duplicator:
transforming the extracted data to form converted data adapted to a target, the transformation directed by one or more integration objects each written in a language that supports inheritance, polymorphism, and encapsulation and compiled into a binary file selected from a DLL file, an ActiveX control, an executable file, and a java applet, each binary file integration object performing at least one conversion step, each binary file integration object comprising a plurality of properties that are modified in the binary file integration object during use through a graphical user interface, the graphical user interface further organizing the binary file integration objects in a hierarchical structure defining an order of execution modified through drag and drop commands, the data duplicator streaming and executing each binary file integration object with the modified properties and each child integration object of each binary file integration object specified in the hierarchical structure as a block.

14. The storage device product of claim 13, wherein the data duplicator is delivered over the Internet and the operations further comprise receiving a payment from a user through a payment gateway, and returning the transformed data, and wherein the data duplicator is an ActiveX control.

15. The storage device of claim 14, wherein the payment comprises a one-time payment such that the payment enables a predetermined number of transformations.

16. The storage device of claim 14, wherein the payment comprises a term payment such that the payment enables one or more transformations of one or more data sources over a period of time.

17. The computer readable medium of claim 13, the binary file integration objects performing SQL commands, the plurality of properties comprising a name, a data type, a version, a conversion object collection, right/left connection DSN, a username, a password, a database type, an event to be called when a record is processed; an integrate data command, an option to return information about the status of a query object, copyright information, a customer name, a version, a hotkey, a step type, a direction, an integration method, a select table, an option to insert from a table, a right/left table name, an execution option before integration object execution, an execution option after integration object execution SQL, a key field, a parent name, a transformation, an addition to a where clause, an exclusive key determining whether an SQL insert needs to have a Where Clause to insure uniqueness, an exclusive uses select table that uses data from a select table to insure uniqueness, an exclusive table used by the exclusive key to insure uniqueness, a DLL file, ODBC Import Export, a text file, a field delimiter, a record delimiter; a checked status verifying whether an associated step has been analyzed, a sub-integration object.

18. A method for decentralized data conversion, the method comprising:
extracting, by use of a processor, source data from a data source to form extracted data;

delivering, by use of the processor, a data duplicator, the data duplicator transforming the extracted data form converted data adapted to a target, the transformation directed by one or more integration objects each written in a language that supports inheritance, polymorphism, and encapsulation and compiled into a binary file selected from a DLL file, an ActiveX control, an executable file, and a java applet, each binary file integration object performing at least one conversion step, each binary file integration objects comprising a plurality of properties that are modified in the binary file integration object during use through a graphical user interface, the graphical user interface further organizing the binary file integration objects in a hierarchical structure defining an order of execution modified through drag and drop commands, the data duplicator streaming and executing each binary file integration object with the modified properties and each child integration object of binary file each integration object specified in the hierarchical structure as a block.

19. The method of claim 18, wherein the data duplicator is provided over the Internet, the method further comprising receiving, by use of the processor, a payment from a user through a payment gateway module, the gateway module operated by a server, wherein the payment is selected from a one-time payment such that the payment enables a predetermined number of transformations and a term payment such that the payment enables one or more transformations of one or more data sources over a period of time; and returning, by user of the processor, the transformed data.

20. The method of claim 19, wherein the term payment is periodic such that the payment recurs every term, the binary file integration objects perform Structured Query Language (SOL) commands, and the plurality of properties comprise a name, a data type, a version, a conversion object collection, right/left connection Data Source Name (DSN), a username, a password, a database type, an event to be called when a record is processed; an integrate data command, an option to return information about the status of a query object, copyright information, a customer name, a version, a hotkey, a step type, a direction, an integration method, a select table, an option to insert from a table, a right/left table name, an execution option before integration object execution, an execution option after integration object execution SQL, a key field, a parent name, a transformation, an addition to a where clause, an exclusive key determining whether an SOL insert needs to have a Where Clause to insure uniqueness, an exclusive uses select table that uses data from a select table to insure uniqueness, an exclusive table used by the exclusive key to insure uniqueness, a DLL file, Open Database Connectivity (ODBC) Import Export, a text file, a field delimiter, a record delimiter; a checked status verifying whether an associated step has been analyzed, a sub-integration object.

* * * * *

UNITED STATES PATENT AND TRADEMARK OFFICE
CERTIFICATE OF CORRECTION

| | | |
|---|---|---|
| PATENT NO. | : 7,661,103 B2 | Page 1 of 1 |
| APPLICATION NO. | : 11/566035 | |
| DATED | : February 9, 2010 | |
| INVENTOR(S) | : Jerry Glade Hayward | |

It is certified that error appears in the above-identified patent and that said Letters Patent is hereby corrected as shown below:

Column 11, Line 55
 "select one ore two"—should read "select one or two"

Column 17, Line 60
 "Table Should be set to"—should read "Table should be set to"

Column 19, Line 36
 "SOL Scripts Tab"—should read "SQL Scripts Tab"

Column 22, Line 37
 "and/or date conversion"—should read "and/or data conversion"

Column 23, Line 49
 "and/or date conversion"—should read "and/or data conversion"

Column 26, Line 50 Claim 1
 "An apparatus to for"—should read "An apparatus for"

Column 26, Line 59 Claim 1
 "form convened data"—should read "form converted data"

Column 30, Line 8 Claim 20
 "(SOL) commands,"—should read "(SQL) commands,"

Column 30, Line 20 Claim 20
 "an SOL insert"—should read "an SQL insert"

Signed and Sealed this

First Day of June, 2010

David J. Kappos
*Director of the United States Patent and Trademark Office*